United States Patent
Benyassine et al.

(10) Patent No.: US 6,804,203 B1
(45) Date of Patent: Oct. 12, 2004

(54) DOUBLE TALK DETECTOR FOR ECHO CANCELLATION IN A SPEECH COMMUNICATION SYSTEM

(75) Inventors: Adil Benyassine, Irvine, CA (US); Patrick D. Ryan, Yorba Linda, CA (US); Huan-Yu Su, San Clements, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 857 days.

(21) Appl. No.: 09/663,246

(22) Filed: Sep. 15, 2000

(51) Int. Cl.[7] .......................... G01R 31/08; H04B 3/20
(52) U.S. Cl. ...................... 370/286; 370/290
(58) Field of Search ................................ 370/286, 290, 370/291, 252; 379/406.01; 704/207, 225, 200; 710/52

(56) References Cited

U.S. PATENT DOCUMENTS 5,727,123 A * 3/1998 McDonough et al. ...... 395/2.33
6,181,794 B1 * 1/2001 Park et al. .................. 379/410
6,272,106 B1 * 8/2001 Kawahara et al. .......... 370/201
6,563,803 B1 * 5/2003 Lee ............................ 370/290

\* cited by examiner

Primary Examiner—Duc Ho
(74) Attorney, Agent, or Firm—Farjami & Farjami LLP

(57) ABSTRACT

A speech communication system is provided that uses pitch information, pitch lags, pitch gains, energy and/or other speech characteristics about the outgoing speech and the unknown signal on a frame basis to determine if the unknown signal is an echo signal of the outgoing speech or if the unknown signal also contains speech from a second talker (double talk). Additionally, a plurality of frames of these characteristics of the outgoing speech signal and the unknown incoming signal may be buffered so that the analysis and comparison can be made more efficiently and quickly in the frame domain as opposed to a time domain. Multiple characteristics may be optionally weighted and then analyzed. The system and method may further determine a level of confidence, based on any criterion, in the determination that may then be used to adjust the gain of a filter.

82 Claims, 12 Drawing Sheets

DOUBLE TALK DETECTOR FOR ECHO CANCELLATION IN A SPEECH COMMUNICATION SYSTEM

CROSS-REFERENCE TO RELATED APPLICATIONS

This application is related to U.S. patent application Ser. No. 09/156,650, titled "SPEECH ENCODER USING GAIN NORMALIZATION THAT COMBINES OPEN AND CLOSED LOOP GAINS," filed Sep. 18, 1998; Provisional U.S. Patent Application Serial No. 60/155,321 titled "4 KBITS/S SPEECH CODING," filed Sep. 22, 1999; and U.S. patent application Ser. No. 09/574,396 titled "A NEW SPEECH GAIN QUANTIZATION STRATEGY," filed May 19, 2000, all of which are incorporated by reference.

BACKGROUND OF THE INVENTION

1. Field of the Invention

The field of the invention relates generally to the cancellation of an echo signal in a voice communication system. More particularly, the invention relates to an echo cancellation system that uses pitch information and/or other speech characteristics.

2. Related Art

The perception of speech is a complex process. It is not yet clear how the human auditory system processes the speech signal. However, it is known that both temporal and spectral analyses of the speech signal are performed. This can be used as a justification for analyzing the speech signal in terms of its frequency-domain as well as its time-domain characteristics.

For most speech sounds, the envelope of the power spectrum is the main factor determining their linguistic interpretation. In fact, in common classifications of speech sounds it is possible to provide a typical power spectrum for each particular speech sound. For voiced segments of speech (e.g., vowels), the fine structure of the power spectrum displays a harmonic structure. That is, sharp peaks in the power spectrum occur at regularly spaced frequency intervals of 75 to 400 Hz, the interval being dependent on the speaker and the utterance. The spacing between the harmonics is called the fundamental frequency. According to basic signal-processing theory, it follows that a harmonic structure in the speech spectrum corresponds to a periodic time-domain signal. Therefore, voiced speech segments have a nearly harmonic frequency-domain structure and a nearly periodic time-domain structure.

When the harmonic structure does not exist in the power spectrum, then the speech segment is called unvoiced. In the time-domain such signal segments display noise-like structure (periodicity is not apparent). Fricatives such as "f" are examples of unvoiced sounds. Whispered speech is completely unvoiced.

To derive its properties, the speech signal is analyzed over short time intervals (frames) of about 20 to 30 ms each. The speech signal is considered to be stationary during each frame. Because of the non-stationary nature of the speech signal, the analysis must be performed over many frames. Two common metrics are associated with the analysis of speech frames: pitch lag and pitch gain. Pitch lag is an estimate of the speech frame's fundamental frequency. Pitch lag measurements are only valid for voiced speech frames. The pitch gain is a measure of the overall match for the pitch lag estimate. The pitch gain could be derived in a variety of ways including, for instance, a normalized pitch correlation or the gain of the adaptive codebook as, for example, in the context of an analysis-by-synthesis approach of a CELP codec. Large pitch gains indicate voiced frames and valid pitch lags. Small pitch gains indicate unvoiced frames and invalid pitch lags.

Impedance mismatches are inevitable in speech communication systems. Connecting a handset that has four wires to the phone lines having two wires creates an impedance mismatch. An impedance mismatch creates an echo signal from the outgoing speech signal of a talker. This echo signal is a reflection of the original speech signal. A person listening to the original speech signal may hear the undesired echo signal. Speech communication systems also generate a delay between the original speech signal and when the listener hears the echo signal. In other words, the echo signal arrives at a certain time after the original speech signal. The greater the delay, the greater the annoyance to the listener. For this reason, designers of communication systems have tried to eliminate this echo with echo cancellers.

In order to cancel the echo signal on the communication line, the echo canceller must analyze an unknown signal and determine whether it is solely an echo signal or also contains the speech of a second person on the line. By convention, if two people are talking over a communication network or system, one person is referred to as "talker 1" or the "near talker," while the other person is referred to as "talker 2" or the "far talker." After talker 1 speaks, a signal may return to talker 1. That incoming signal may be an echo of talker 1's speech signal, or a combination of an echo signal and the speech signal of talker 2. This combination is referred to as "double talk" An echo canceller is placed in the communication line and must be able to differentiate between an echo signal and double talk because the echo canceller must only cancel the echo signal, but not the double talk.

To determine whether the unknown incoming signal contains an echo signal component without double talk, the echo canceller must estimate the characteristics of an echo signal based on the outgoing signal. Since the outgoing speech signal changes (due to talker 1 voicing different speech patterns over time), the echo canceller must be able to analyze the outgoing speech signal and adapt its estimation of what the expected echo signal will be so that the echo canceller can look for and eliminate the echo signal. To model the echo and its delay, a transversal filter with adjustable taps often is used. Each tap receives a coefficient that specifies the magnitude of the corresponding output signal sample and each tap is spaced a sample time apart. The better the echo canceller can estimate what the echo signal will look like, the better it can eliminate the echo. To improve performance, it may be desirable to vary the adaptation rate at which the transversal filter tap coefficients are adjusted. For instance, if the echo canceller is sure that the unknown incoming signal is an echo, it is preferable for the echo canceller to adapt fast, estimate the echo signal as fast as possible, and eliminate the echo signal as quickly as possible. On the other hand, if the echo canceller is sure that the unknown incoming signal is not just an echo but double talk, it is preferable to decline to adapt at all. If there is an error in determining whether the unknown incoming signal is an echo signal, a fast adaptation method would cause rapid divergence and a failure to eliminate the echo. Thus, besides determining whether the unknown incoming signal is an echo or double talk, there is a need to know the level of confidence in the decision.

Other approaches to detecting double talk are cumbersome and computationally intensive. In fact, they may require a dedicated DSP (digital signal processing) chip just to perform the echo cancellation function.

The prior art echo cancellers try to compare the unknown signal with the far-end talker's speech signal on a sample by sample basis in the time domain and because they do not know the delays of the speech communication system, they do this comparison over a wide range of samples. In other words, the prior art echo cancellers accounted for delays between the far-end talker's speech signal and its echo by comparing a sample of the unknown signal with many samples of the far-end talker's speech signal to see if any of the comparisons matches. Because of the unknown delay, the prior art had to perform this comparison many times, which made the detection of double talk computationally intensive. Note that the detection of an echo means that double talk was not detected, and vice versa. To demonstrate the inefficiency of the prior art approach, assume that the window of a possible match between a signal and its echo is 1 second. Thus, if the sample rate is 8000 per second, a sample of the unknown signal must be compared against 8000 samples (1 second worth) of the far-end talker's speech signal. This cumbersome approach slowed the detection of double talk and decreased the efficiency of echo cancellers. The intensive process required the prior art to sometimes dedicate a processor to the double talk detection process. One solution to the problems presented in prior systems is to have a double talk detection algorithm that is simpler so that a separate DSP is not required or so that less computational resources are required. However, it is also important that the double talk algorithm be robust and not fail readily.

SUMMARY

This invention provides a system for detecting an echo signal in a voice communication system. In particular, the echo detection and/or cancellation system uses a speech characteristic or characteristics about the outgoing speech and the unknown signal to determine if the unknown signal is an echoed version of the outgoing speech or also contains a speech signal from a second talker (double talk). For example, the echo detection system may compare the pitch lags, pitch gains, energies, and/or other characteristics of the outgoing speech signal with that of the unknown incoming signal to determine whether the unknown signal is an echo signal. Additionally, a certain number of frames of these characteristics of the outgoing speech signal and the unknown incoming signal may be buffered so that the analysis and comparison can be made more efficiently and quickly in the frame domain as opposed to a time domain. Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

DETAILED DESCRIPTION

Figure 1:
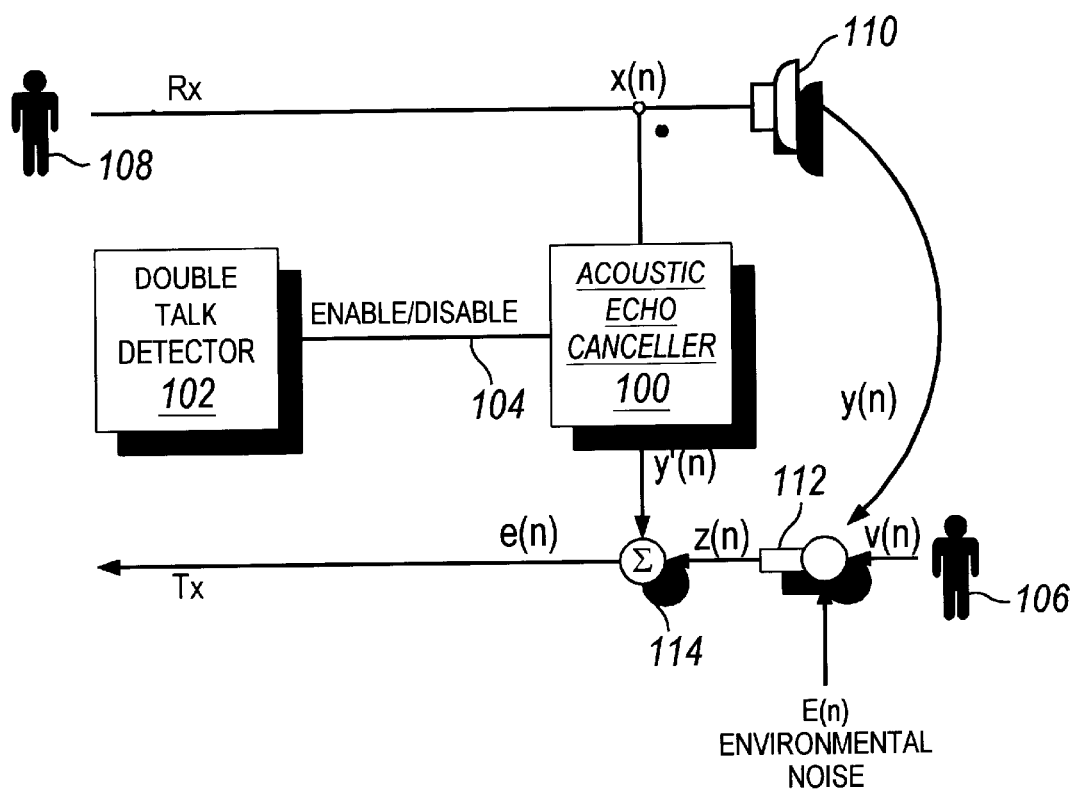
FIG. 1 is a block diagram of a speech communication system with an echo canceller and double talk detector.

An echo cancellation system for a speech communication system may be used with any kind of speech communication system. The echo cancellation system shown in FIG. 1 illustrates an acoustic echo canceller 100, a double talk detector 102, and an adaptive filter. The acoustic echo canceller 100 is connected to the double talk detector. 102 via an enable/disable path 104. This echo cancellation system detects double talk (as opposed to an echo), enables or disables the echo canceller depending on whether double talk is detected, and eliminates the echo signal without interfering with a full-duplex conversation over the speech communication system. While not shown, there may be a signal processor or other control unit that controls the echo canceller and/or the double talk detector. Also, the echo canceller and double talk detector functions may be performed by separate processors or integrated into a single processor. A near-end talker (i.e., talker 1) 106 outputs a speech signal v(n) which is picked up by input device 112. A far-end talker (i.e., talker 2) 108 outputs a speech signal x(n) that is played through a loudspeaker 110. y(n) is the actual echo signal of x(n) along the actual echo path. y'(n) is the estimated echo signal through the adaptive filter in the acoustic echo canceller 100. E(n) represents the background environmental noise.

The estimated error signal e(n), configured at adder 114, is transmitted to the far-end is given by:

$$e(n)=v(n)+E(n)+y(n)-y'(n) \qquad \text{(Equation 1)}$$

Because of the time varying nature of the echo path, the echo cancellation system has an adaptive filter that estimates the echo signal using the received far-end signal x(n) and the residual error signal e(n). In double talking situations, the estimation of the echo signal can be erroneous because the near-end talker signal v(n), which is added to the error signal, creates interference to the adaptive filter. Thus, the double talk detector 102 prevents the adaptive filter's estimated echo signal from diverging from a true echo signal.

The echo cancellation system analyzes information in a frame from the outgoing speech signal at the far-end talker and information in a frame from the unknown incoming speech signal. Based on correlations between the information in the two signals, the echo cancellation system determines whether the unknown signal is an echo of the far-end talker's speech signal or non-echo signal. If the information or characteristic(s) of the unknown signal matches that of the far-end talker's speech, it is very likely that the unknown signal is an echo of the far-end talker's speech signal. This analysis typically is made over a number of frames so as to prevent a rare coincidental matching of speech information from causing the unknown signal to be declared an echo when it is actually not an echo (i.e., a "false echo"). The number of frames to analyze may be a predetermined number or varied according to the situation.

As an example of the types of speech information to analyze, the echo cancellation system may compare the pitch lag information from the far-end talker's speech signal with that of the unknown incoming speech to determine if the unknown signal is an echo signal or also contains a speech signal from the near-end talker (double talk). Alternatively, the echo cancellation system may compare the pitch gain information about the far-end talker's speech signal with that of the unknown incoming speech. Still alternatively, the echo cancellation system may use both the pitch lag and pitch gain information.

Another alternative is to compare the energy of the far-end talker's speech signal with the energy of the unknown incoming speech. Also, comparison of pitch information (such as pitch lags and/or pitch gains) and the energy information may be used.

When using more than one characteristic regarding the speech signals, another alternative is to weight each characteristic differently. The weighting scheme may be a predetermined amount or varied depending on the situation. Interestingly, the characteristic(s) of the speech need not be computed in the precise manner described earlier in this specification. Instead, the characteristic(s) of the speech can be computed in a variety of schemes. For example, the echo cancellation system may use pitch gain information or any other manner that provides determining the characteristic.

A further enhancement in the echo cancellation system is to buffer the characteristic(s) in the far-end talker's speech signal and the unknown signal. Ideally, this information should be buffered from a number of frames to account for the maximum or worst case delay between a speech signal and its echo in the speech communication system. By knowing the frame size and the maximum delay of the speech communication system (which may be provided as a system parameter or calculated when possible), the echo cancellation system determines the number of frames where a match between the far-end talker's speech signal and its echo must occur. Accordingly, the system compares the characteristic(s) of the unknown signal with that of the far-end talker's signal over this number of frames.

Assuming that the window of a possible match between a signal and its echo is 1 second. If there are 100 frames per second, a frame of the unknown signal must be compared against 100 frames (1 second worth) of the far-end talker's speech signal. Therefore, it is apparent that 100 comparisons are much less computationally intensive and cumbersome as a system having 8000 comparisons. Consequently, the echo cancellation system detects double talk with far greater speed and efficiency. This may be sufficient to eliminate the need for a dedicated processor to detect double talk.

If the unknown signal is identified as a double talk signal instead of an echo, the echo canceller stops its adaptation process. It is desirable to stop the adaptation process as quickly as possible in the advent of a double talk signal detection so that the echo canceller does not diverge. The adaptation process can be any adaptation method. For example, a LMS (least means square) algorithm, NLMS (normalized least means square) algorithm, RLMS (recursive least means square) algorithm, a lattice algorithm, or any other kind of adaptation method may be implemented.

There is also a need to determine the level of echo or double talk detection confidence as to this determination. Thus, another enhancement in the echo cancellation system is to provide information about the level of confidence of the double talk detection. A confidence level processor, may simply be part of the signal processor(s) that controls the echo canceller and/or double talk detector. The confidence level processor may set the level of confidence in a counter or a plurality of counters. One counter could measure the level of confidence that the unknown signal is an echo, while another counter could measure the level of confidence that the unknown signal is a double talk signal. For instance, the counter may count the number of times of frame matches. That is, the number of times that a characteristic in a frame of the unknown signal matches that of the outgoing speech signal. For example, a counter may count the number of times that the pitch lag of the unknown signal matches the pitch lag of the far-end talker's signal. As another example, a counter may count the number of times that the pitch gain of the unknown signal matches the pitch gain of the far-end talker's signal. The higher the number, the greater the confidence that the unknown signal is an echo.

Alternatively, a plurality of counters may be used. One counter may count the matches for one characteristic such as the pitch lag, a second counter may count the matches for another characteristic such as the pitch gain, and/or a third counter may count the matches for another characteristic such as the energy of the signal. Each counter could be assigned a weight so that a weighted value can be derived as the overall confidence level. When updating the filter coefficients, the value of the gain factor is directly proportional to the confidence level. Thus, as the confidence level decreases, the gain decreases so that the effect of an error is decreased.

Figure 2:
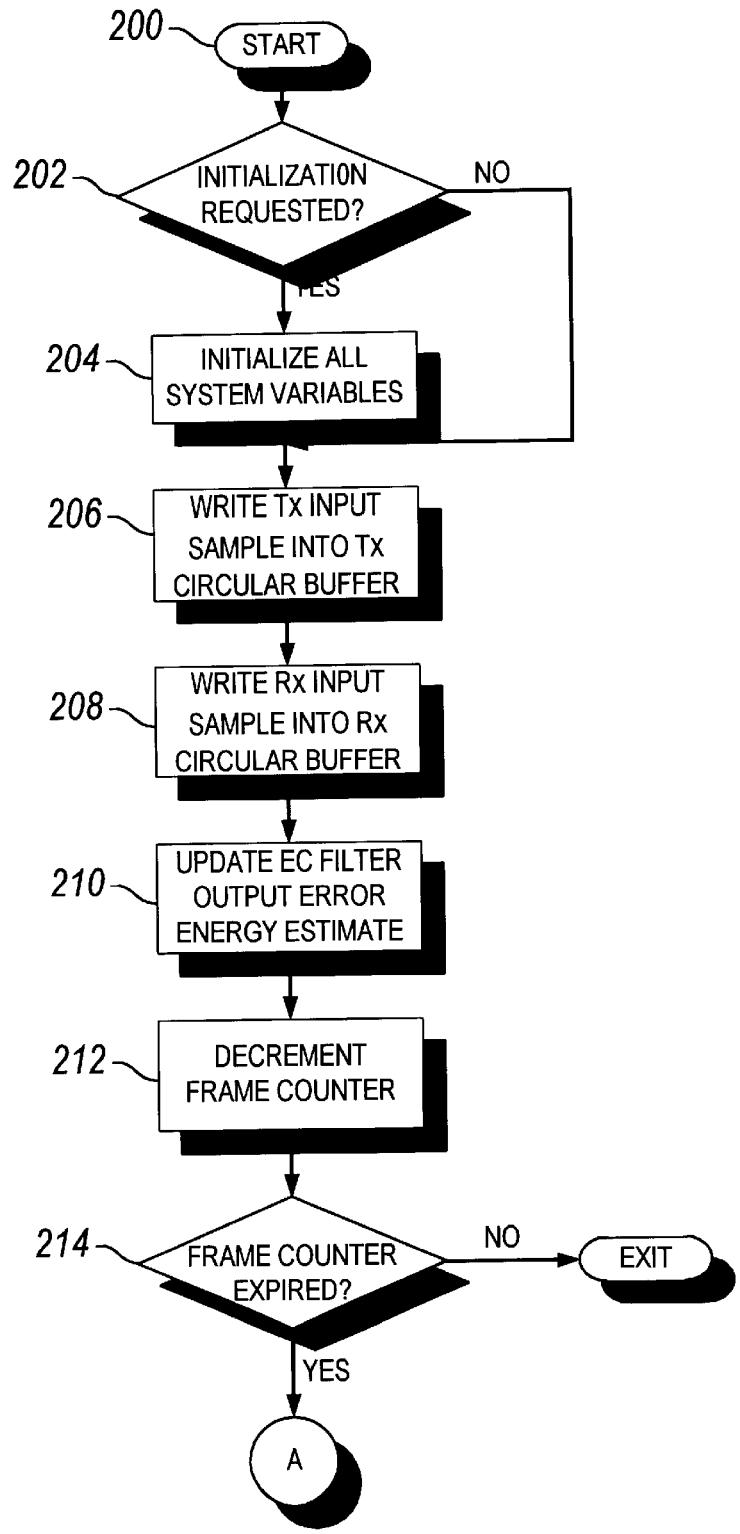
FIG. 2 is a flow chart illustrating initialization of system variables and loading of signals into buffers.
Figure 3:
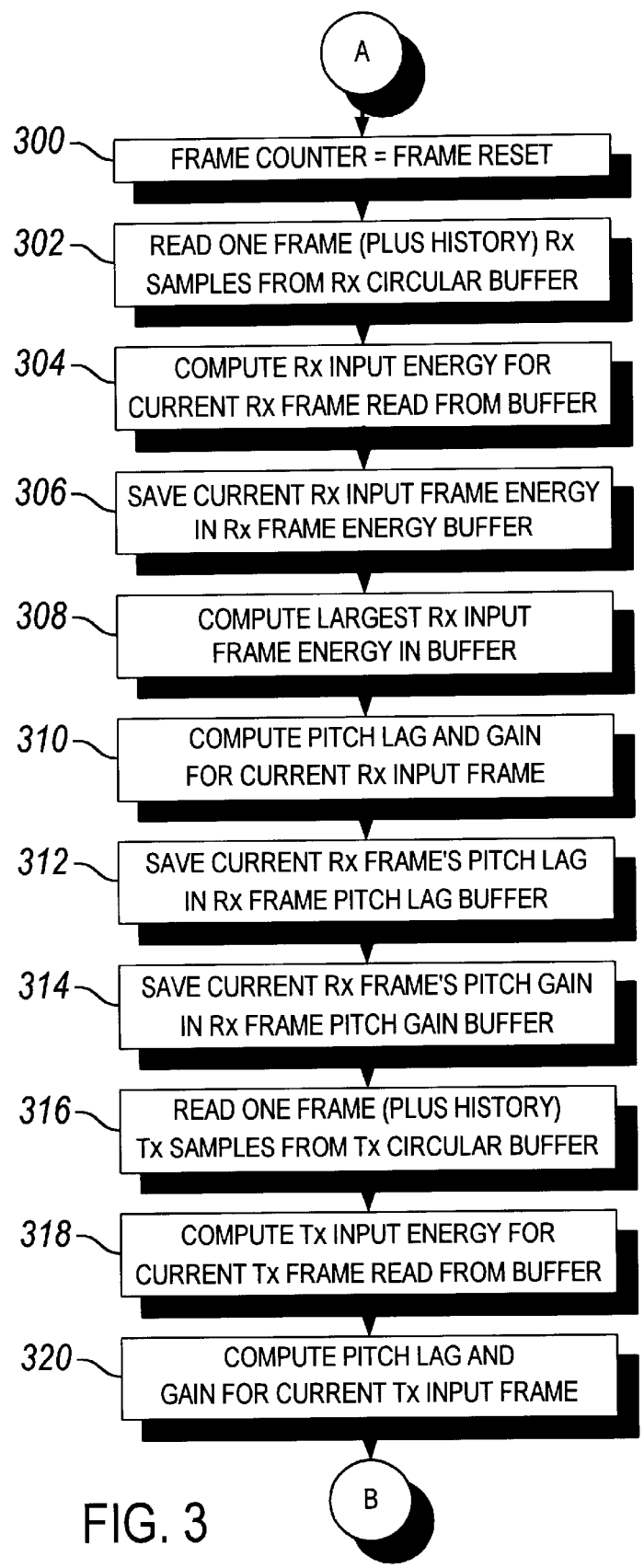
FIG. 3 is a flow chart illustrating extraction of the $R_x$ and $T_x$ frames from input buffers.

FIGS. 2–12 are flowcharts of an example embodiment of a double-talk detector system. FIG. 2 demonstrates an example of the initialization of the system's variables, the loading of the unknown signal (referred to as the "transmission input" or "Tx input") and the signal from the far-end talker (referred to as the "receive input" or "Rx input") may be loaded into their respective circular buffers, the updating of the output energy of the echo canceller's filter, and the tracking of the frame timing.

The flowchart of FIG. 2 is executed for every sample of a frame. The method is started in step 200. Step 202 determines whether there was an initialization request. If an initialization request was made, all system variables are initialized in step 204. Otherwise, step 204 is skipped. Step 206 writes a sample of the Tx input into the transmission circular buffer where the Tx input is the unknown signal that can be either a signal transmitted from the near-end talker, an echo signal from the far-end talker (e.g., an echo of the Rx input), or both (e.g., "double-talk"). Step 208 writes a sample of the Rx input to the receive circular buffer where the Rx input is the signal from the far-end talker.

Step 210 updates the echo canceller's (EC) filter output error energy estimate. The echo canceller has a filter that may be, for example, a transverse filter, or any other kind of filter used in echo cancellation. The EC filter tries to estimate what an echo of the Rx input would be. This estimated echo is eventually removed from the system by subtracting the estimated echo from the Tx signal. One input to the filter is an error signal. The error signal measures the error in the filter's estimation of the echo signal. The error signal is equal to the Tx input minus the filter's outputted estimated echo signal.

The system analyzes a frame's worth of samples of signals in order to determine certain parameters such as pitch lag. The frame counter counts the number of samples contained in a frame. Step 212 decrements the frame counter. When the frame counter reaches zero, a frame's worth of samples have been processed by steps 206 and 208.

Step 214 determines whether the frame counter has expired. If the frame counter has not expired, the system exits because a frame's worth of samples has not been collected so the system cannot continue the process. If the frame counter has expired, the system has a frame's worth of samples and proceeds to step 300 in FIG. 3 via connector A.

The flowcharts of FIGS. 3–12 are executed once per frame. From connector A, the process in FIG. 3 extracts the Rx and Tx frames from the circular Rx and Tx circular input buffers, calculates the energy estimates, pitch lag and gains and stores the calculated values in buffers. Step 300 sets the frame counter equal to frame reset which is the number of samples expected per frame. Step 302 reads one frame's worth of Rx input samples from the Rx circular buffer. In step 302, an additional amount of Rx input samples from the previous frame are retrieved (referred to as "history" or "historical samples"). Historical samples may be needed to determine certain parameters such as the pitch lags and pitch gains. The required extra history samples correspond to the largest allowable pitch lag value. Step 304 computes the energy level of the Rx input for the current Rx frame read from the buffer. Step 306 saves the current Rx input frame energy into the Rx frame energy buffer. Step 308 computes the largest Rx input frame energy in the buffer. Because of delay in the system, there is no guarantee that the Rx input sample will align in time with the corresponding Tx input sample in the case of an echo. Therefore, the system goes backward in the Rx buffer the number of frames needed to account for the maximum echo delay.

Step 310 computes the pitch lag and gain for the current Rx input frame. The required length of the Rx frame energy, pitch lag and pitch gain buffer corresponds to the maximum delay between the Rx input signal and its echo. The maximum delay may be determined and known from a given communication system's parameters. Step 312 saves the current Rx frame's pitch lag in the Rx frame pitch lag buffer. Step 314 saves the current Rx frame's pitch gain in the Rx frame pitch gain buffer.

Similarly, step 316 reads one frame's worth of Tx input samples from the Tx circular buffer plus some history samples. Step 318 computes the Tx input energy for the current Tx frame read from the buffer. Step 320 computes the pitch lag and gain for the current Tx input frame.

Figure 4:
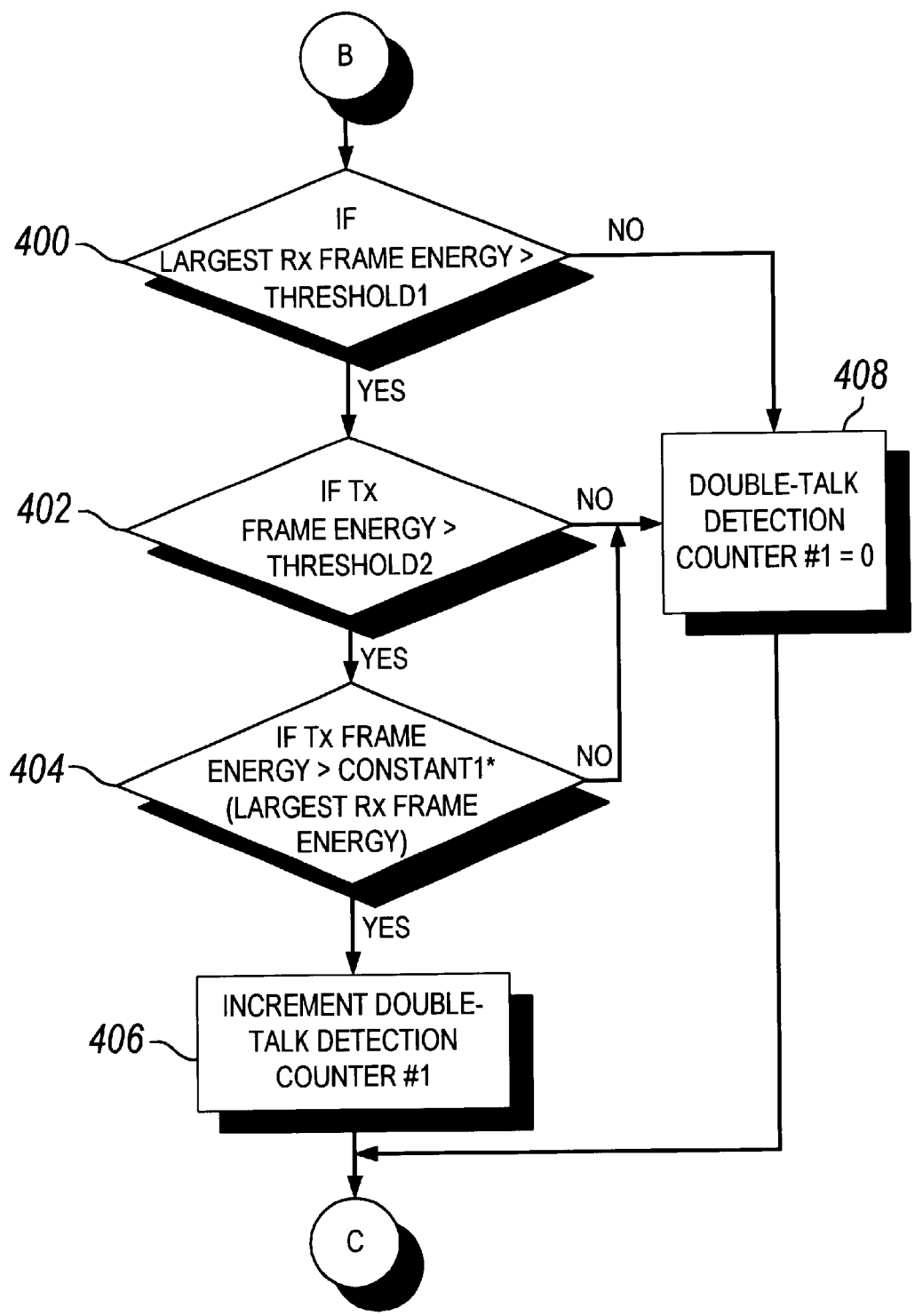
FIG. 4 is a flow chart illustrating determination of whether double talk is occurring.

FIG. 4 is a flowchart that compares the energy signal levels of the Tx and Rx input signals to determine if double talk is occurring. Whenever the energy level of a frame of the Tx input is greater than the largest possible allowable echo energy level, double talk is deemed to be occurring and a counter is incremented.

Step 400 determines if the largest Rx frame energy selected in step 308 is greater than Threshold 1, the Rx frame energy threshold. Threshold 1 corresponds to the smallest allowable energy level of an Rx input signal, which is determined from the particular communication system's parameters. If the greatest Rx frame energy is less than Threshold 1, the Rx frame energy is too small to count as a received Rx input signal to be processed. If the Rx frame energy is too small to count as an Rx input signal, the double talk detection Counter #1 is set to 0 in step 408 and the process skips to step 500. The double talk detection Counter #1 indicates the number of frames in which the Tx input is not an echo based on the frame energies of the Tx input and the Rx input.

On the other hand, if the largest Rx frame energy is greater than Threshold 1, there is an Rx input to analyze and the system proceeds to step 402. In step 402, the system determines whether the frame energy of the Tx input is greater than Threshold 2. The Tx frame energy threshold, Threshold 2, corresponds to the smallest allowable Tx energy level. If the frame energy of the Tx input is not greater than Threshold 2, the system considers there to be no valid Tx input to analyze. Accordingly, the double talk detection Counter #1 is set to 0 in step 408 and the process skips to step 500. Otherwise, the process continues to step 404 where the process determines if the frame energy of the Tx input is greater than a scaled version of the largest frame energy of the Rx input, Constant 1 *(largest frame energy of the Rx input). The Tx/Rx energy comparison constant, Constant 1, corresponds to the maximum allowable relative echo level as set by the communication system. If the frame energy of the Tx input exceeds the scaled version of the largest Rx frame energy, the energy level of the Tx input exceeds the maximum energy level of an echo and thus, the Tx input cannot be an echo. Accordingly, the system goes to step 406 that increments the double talk detection Counter #1 and then continues with step 500. If the Tx frame energy is less than the maximum energy level of an echo, the system goes to step 408 that sets the double talk detection Counter #1 to 0 and then goes to step 500. Threshold 1, Threshold 2 and Constant 1 are known parameters set by the communication system.

Figure 5:
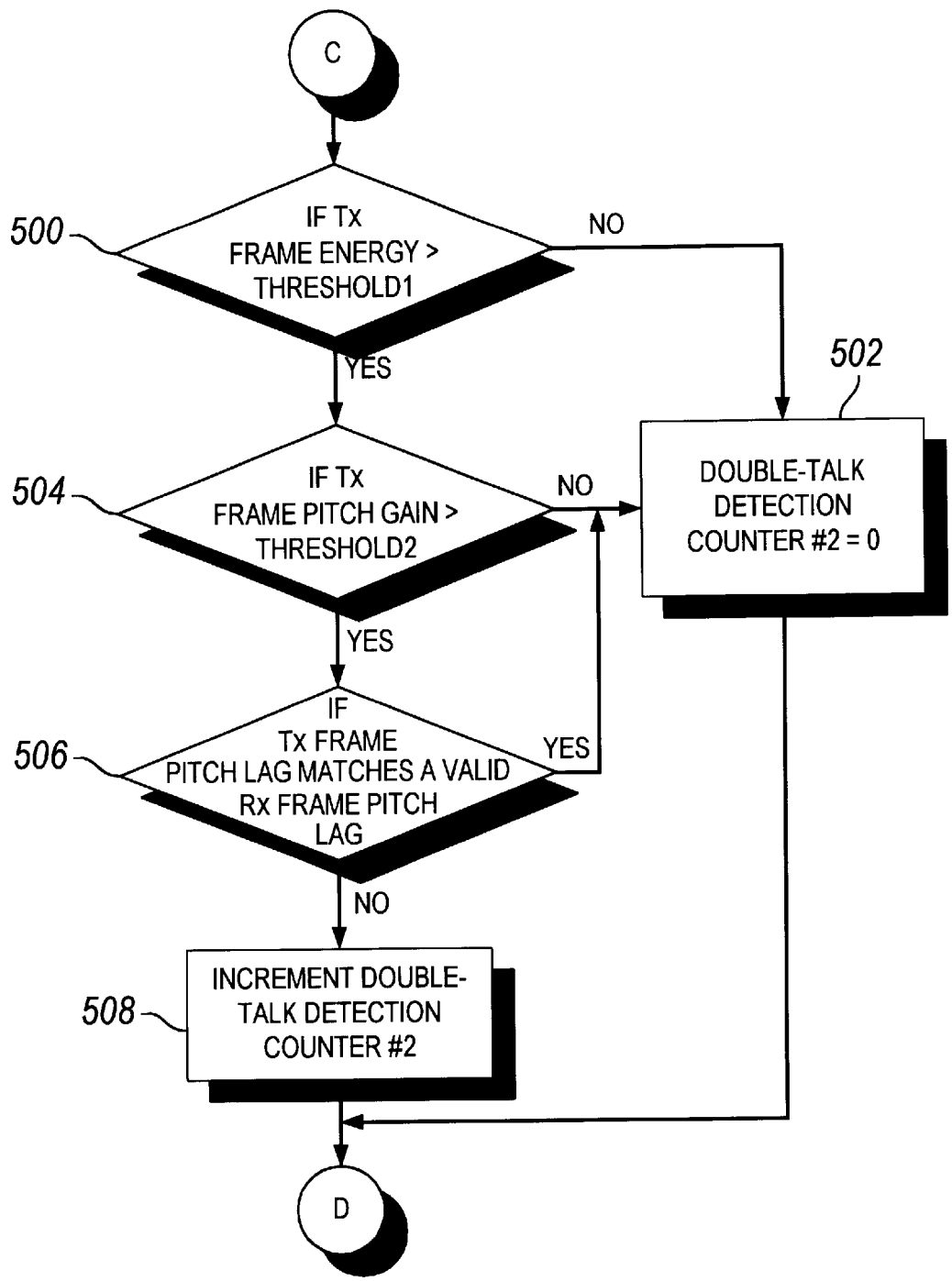
FIG. 5 is a flow chart illustrating a check of the voiced frames for similarity.

FIG. 5 is a flowchart describing the steps to check the voiced frames of the Tx input and Rx input for similarity. FIG. 5 does not process unvoiced frames. If the Tx input is an echoed version of the Rx input, then the pitch lags of the Tx voiced frames should match the pitch lags of the Rx voiced frames. If the pitch lags do not match, the Tx input contains a signal from the near-end talker, double talk is deemed present, and the double talk Counter #2 is incremented.

Step 500 determines if the frame energy of the Tx input is greater than Threshold 1, the Tx frame energy threshold that corresponds to the smallest allowable Tx signal level. If not, the system presumes that the input was too small to count as a Tx input. Accordingly, step 502 sets the double talk detection Counter #2 to 0 and skips to step 600. The double talk detection Counter #2 counts the number of frames of double talk based on whether the pitch lags of the Tx input and the Rx input match.

If the Tx frame energy is greater than Threshold 1, meaning that a valid Tx input exists, step 504 determines whether the pitch gain of the Tx input is greater than Threshold 2. Threshold 2 is the Tx pitch gain threshold that corresponds to the smallest allowable pitch gain value for a voiced frame. If the pitch gain of the Tx input is not greater than Threshold 2, the Tx input is not a voiced frame. Accordingly, step 502 clears the double talk detection Counter #2 and skips to step 600 because steps 506 and 508 are executed only for voiced frames.

If the pitch gain of the Tx input is greater than Threshold 2, step 506 determines whether the frame pitch lag of the Tx input matches the pitch lag of an Rx input. Because the amount of delay between an Rx input and its echo is an unknown variable, the system compares the frame pitch lag of the Tx input with the pitch lag of every Rx input in the Rx pitch lag buffer. For step 506, a "match" need not be a perfect match and preferably encompasses a comparison that is "close enough." If the frame pitch lag of the Tx input does not match the pitch lag of any Rx input, the Tx input is not an echo, then step 508 increments the double talk detection Counter #2 and proceeds to step 600. On the other hand, if the frame pitch lag of the Tx input matches the pitch lag of an Rx input (e.g., Tx input is an echo), then the double talk detection Counter #2 is cleared in step 502 and the flowchart proceeds to step 600.

Figure 6:
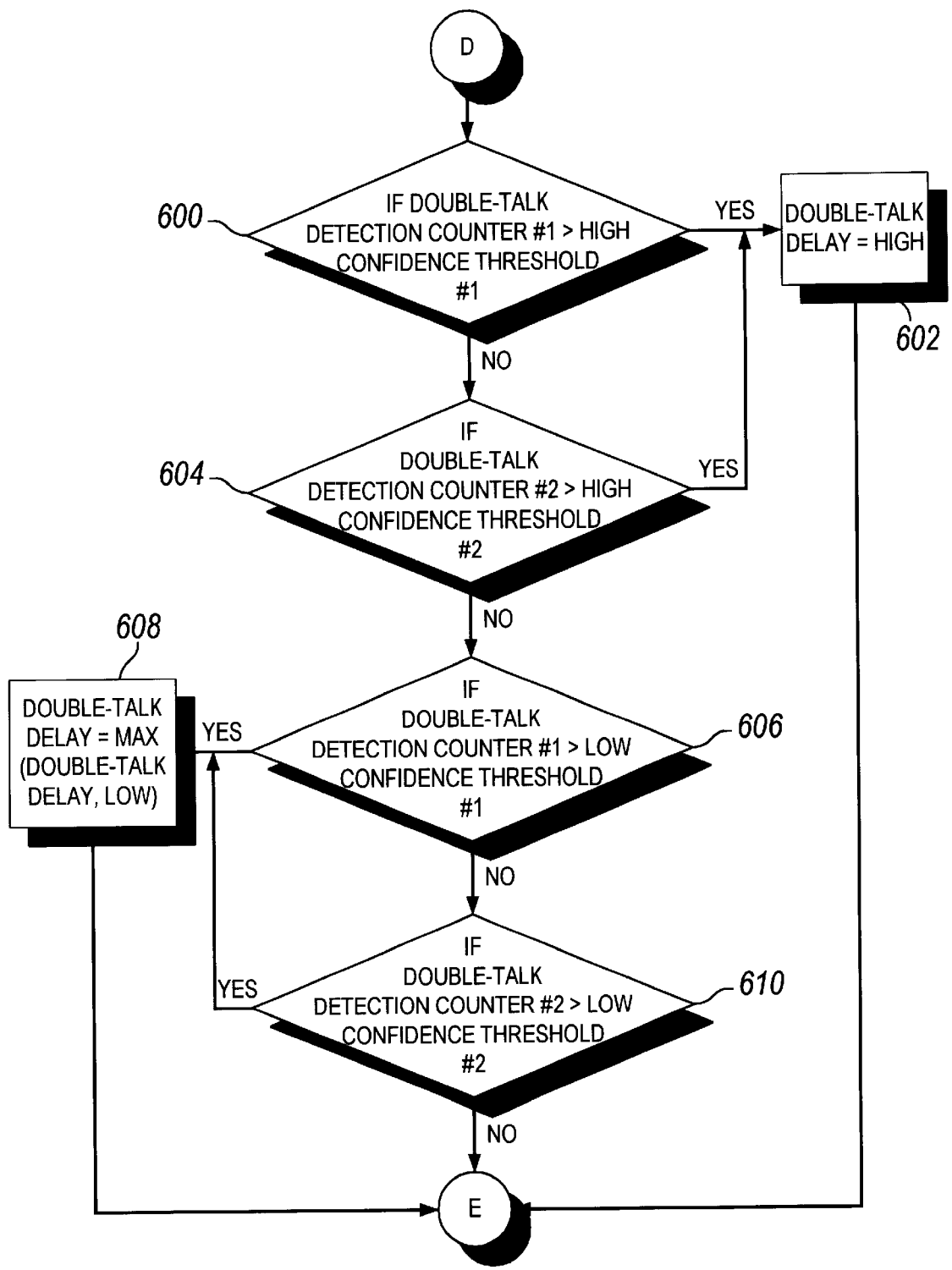
FIG. 6 is a flow chart illustrating double talk detector counters.

The flowchart of FIG. 6 examines double talk detector Counters #1 and #2 and the double talk delay counter. The double talk detection Counter #1 counts the number of frames (voiced and unvoiced frames) where the Tx input is double talk based on whether the energy level of the Tx input was too large to be an echo. The double talk detection Counter #2 counts the number of voiced frames of double talk based on whether the pitch lags of the Tx input and the Rx input match. The double talk delay counter is a common counter that indicates whether double talk is already in-progress based on double talk detection Counters #1 and #2. Whenever either of double talk detection Counters #1 or #2 exceeds certain thresholds, the double talk delay counter is set to a value to indicate that the double talk condition continues to be in-progress. The value of the double talk delay counter indicates the level of confidence that double talk is actually present. For example, a high value may be a few seconds' worth of frames, while a low value may be 100 milliseconds' worth of frames.

Step 600 determines whether the double talk detection Counter #1 is greater than the high confidence Threshold #1. If yes, the number of double talk frames based on frame energies provides a high level of confidence that the frames contain double talk. Accordingly, step 602 sets the double talk delay counter to high and the process skips to step 700. If the double talk detection Counter #1 is less than or equal to the high confidence Threshold #1, the number of double talk frames based on frame energies does not provide a high level of confidence that the frames contain double talk.

Consequently, the system checks in step 604 to determine if the double talk detection Counter #2 provides a high level of confidence that the frames contain double talk. Step 604 determines if the double talk detection Counter #2 is greater than the high confidence Threshold #2. If the double talk detection Counter #2 is greater than the high confidence Threshold #2, the double talk detection Counter #2 provides a high confidence level that there is double talk. Step 602 sets the double talk delay counter to high and skips the process to step 700. If the double talk detection Counter #2 is less than or equal to the high confidence Threshold #2, the double talk detection Counter #2 also failed to establish a high level of confidence that there is double talk.

This particular example of a double talk detector uses more than one level of confidence. Specifically, this example uses two levels of confidence: high and low. As a result, the system checks to see if the double talk detection Counters #1 and #2 indicate a high level of confidence, a low level of confidence, or a less than low confidence that there is double talk. Here, after the double talk detection Counters #1 and #2 failed to indicate a high level of confidence, the system checks to see if the counters indicate a low level of confidence. Of course, the system can easily be adapted to use any number of confidence levels. This double talk level of confidence is stored for use by the system in the future for example to enable or disable the echo canceller's updating of the filter.

Step 606 determines whether the double talk detection Counter #1 is greater than a low confidence Threshold #1. If the double talk detection Counter #1 is greater than a low confidence Threshold #1, there is a low level of confidence that there is double talk. Thus, step 608 sets the double talk delay counter to the maximum of the previous state of the double talk delay counter and a low value. The double talk delay counter is not made smaller than its previously highest state so that the system errs on the side of declaring the Tx input a double talk signal.

If the double talk detection Counter #1 is less than or equal to a low confidence Threshold #1, this counter does not indicate at least a low level of confidence of double talk. In this case, the system turns to the double talk detection Counter #2. Step 610 determines if the double talk detection Counter #2 is greater than a low confidence Threshold #2. If yes, step 608 is executed. Otherwise, the level of confidence that there is double talk is very low, so the system leaves the double talk delay counter alone and the process continues to step 700.

Figure 7:
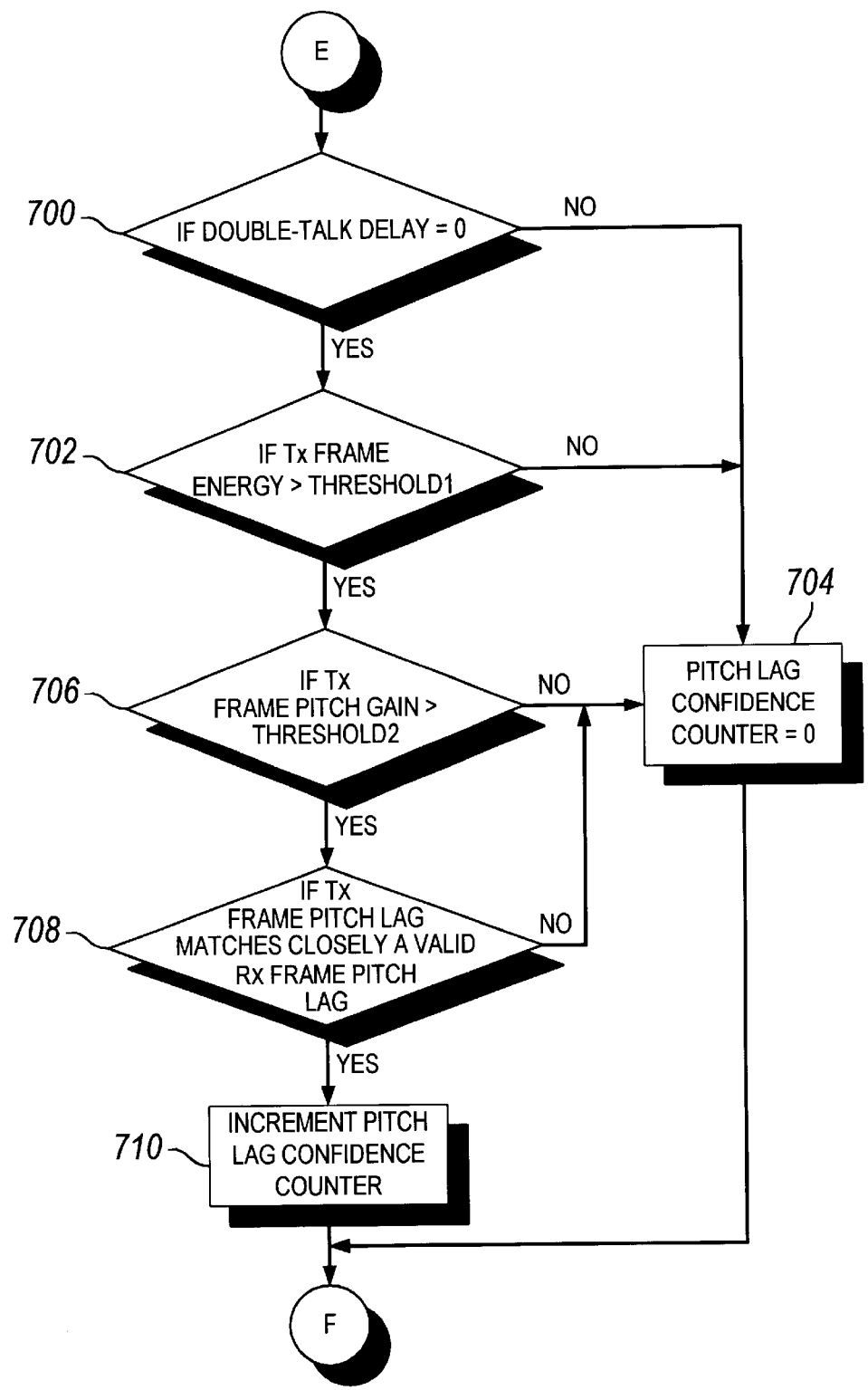
FIG. 7 is a flow chart illustrating re-confirmation of the presence of an echo.

When the previous flowcharts indicate that there is not double talk, the flowchart in FIG. 7 re-confirms the presence of an echo. To do so, FIG. 7 looks at voice frames only and computes another confidence measure (the pitch lag confidence counter) to adjust the echo canceller's update of the filter's gain coefficient. The pitch lag confidence counter indicates the confidence level of the belief that the Tx input is an echo based on a comparison of the pitch lag of the Tx input frame with the pitch lag of an Rx input frame. The pitch lag confidence counter is incremented whenever the pitch lag of a voice frame of the Tx input matches very closely to the pitch lag of a voice frame of any Rx input. A close match of pitch lags generally occurs whenever the Tx input is an echoed version of the Rx input. Further, a close match most likely will not occur if the Tx input contains a signal from the near-end talker. How closely the match must be can be set to as would be appropriate for the situation.

Following each step of FIG. 7, step 700 determines whether the double-talk delay counter is 0. If the double talk delay counter is not zero, double talk exists and step 704 clears the pitch lag confidence counter and skips the process to step 800.

If the double talk delay counter is zero, no double talk is indicated and step 702 determines if the frame energy of the Tx input exceeds Threshold 1, which corresponds to the smallest allowable energy level of a valid Tx input. If the frame energy of the Tx input does not exceed Threshold 1, the frame is not a valid Tx input frame and step 704 clears the pitch lag confidence counter and skips to step 800.

Otherwise, if the frame energy of the Tx input exceeds Threshold 1, there is a valid Tx input frame to consider and step 706 determines if the pitch gain of the Tx input frame exceeds Threshold 2 where Threshold 2 corresponds to the smallest allowable pitch gain value for a voiced Tx frame.

If the pitch gain of the Tx input frame does not exceed Threshold 2, the Tx input frame is not a voiced frame. As a result, step 704 clears the pitch lag confidence counter and the process skips to step 800 because the pitch lag comparison of step 708 cannot be performed on unvoiced frames. If the pitch gain of the Tx input frame exceeds Threshold 2, meaning that the Tx input frame is a voiced frame, step 708 determines if the pitch lag of the Tx input matches closely to the pitch lag of an Rx input frame in the Rx buffer. If the pitch lags do not match closely, the Tx input frame might not really be an echo. Thus, step 704 clears the pitch lag confidence counter and the process skips to step 800. If the pitch lags match closely, the Tx input frame considered is most likely an echo, and the pitch lag confidence counter is incremented in step 710. The pitch lag confidence counter is used later to calculate the adaptation gain for updating the echo canceller filter. If the system is sure the Tx input is an echo, it is desirable to use a very high gain to update the filter so that the filter will converge faster.

Figure 8:
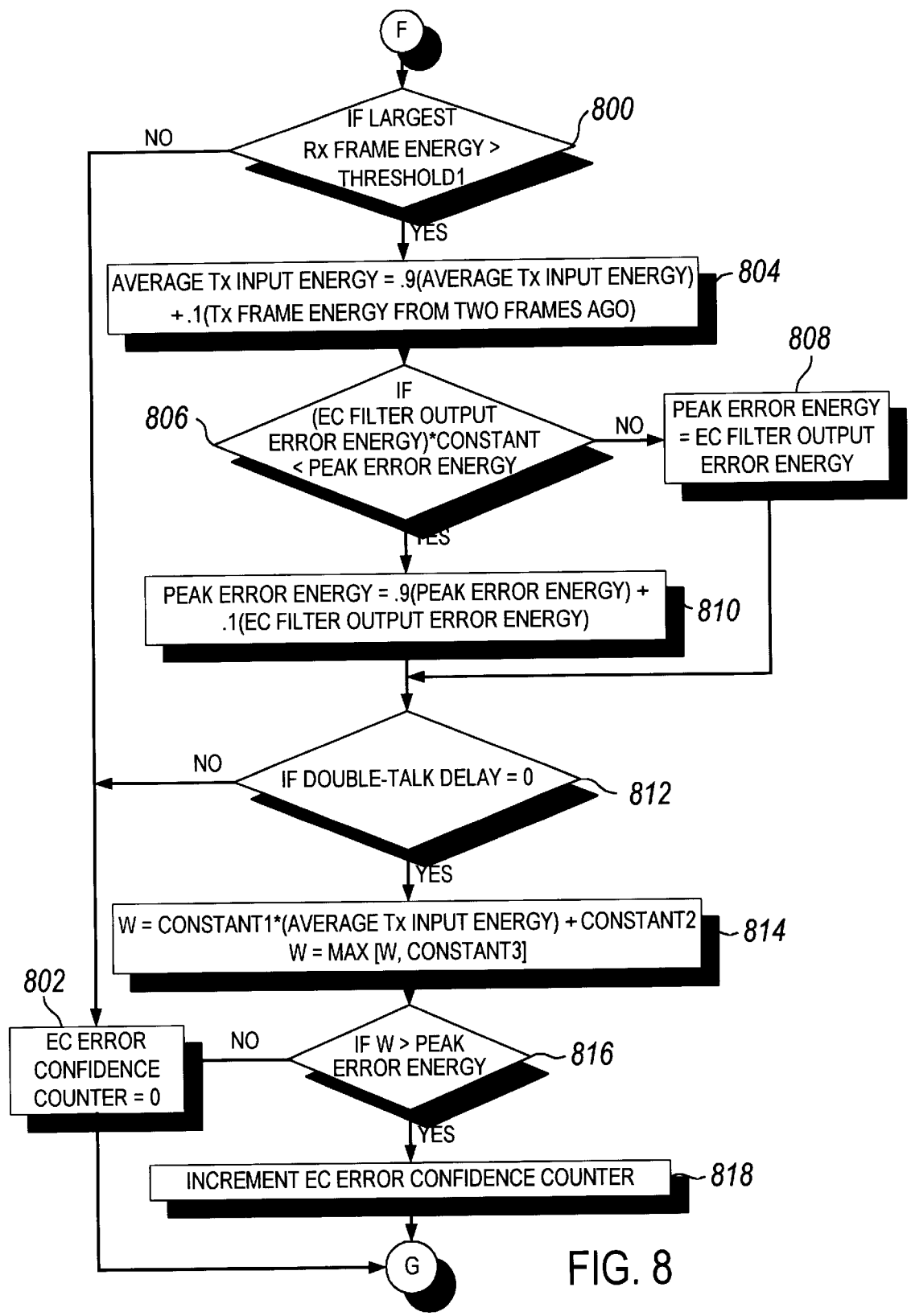
FIG. 8 is a flow chart illustrating determination of whether the $T_x$ input frame is an echo.
Figure 9:
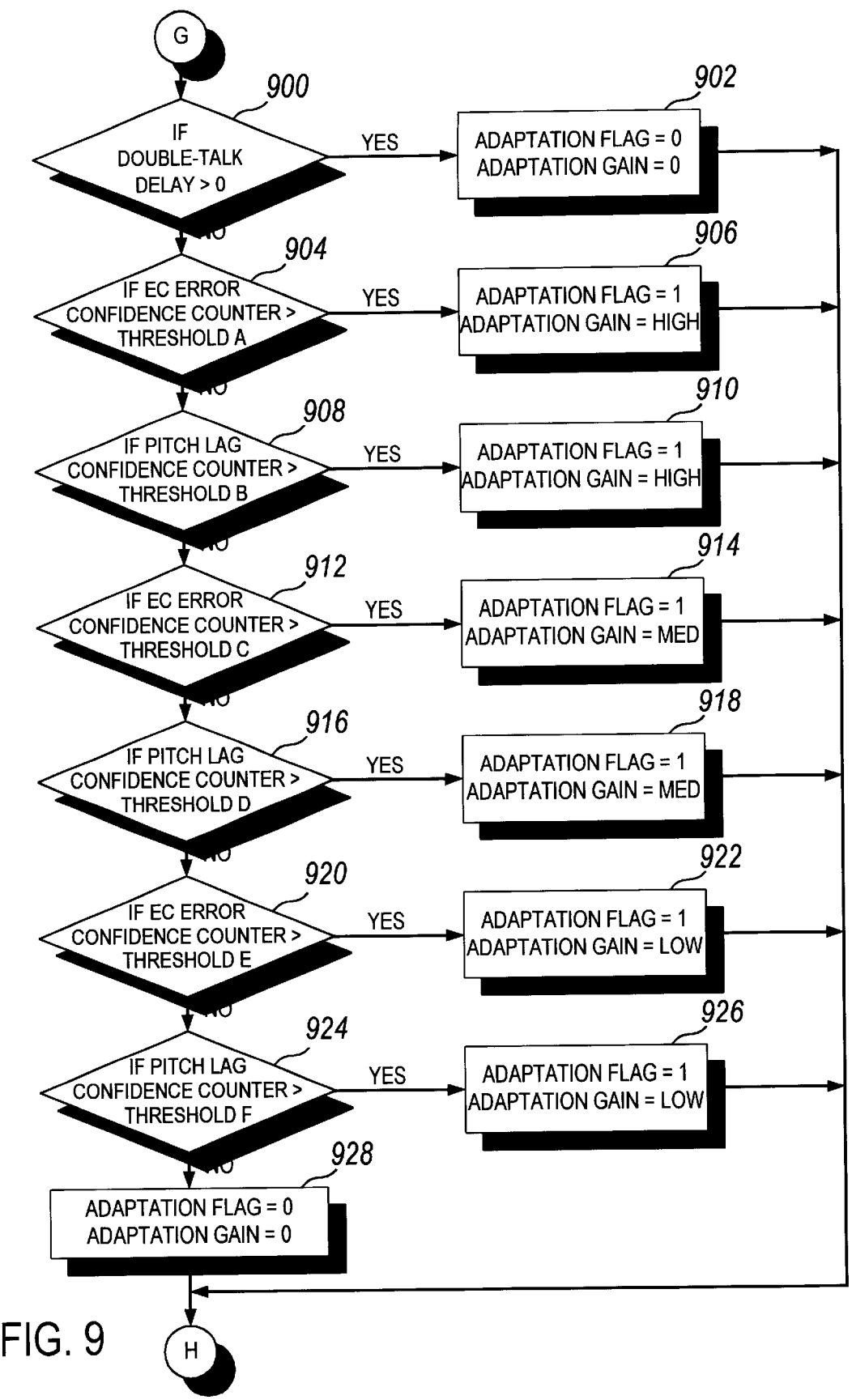
FIG. 9 is a flow chart illustrating operation of the confidence counter.

The flowchart in FIG. 8 operates on voiced as well as unvoiced frames. The system considers unvoiced signals because they also have valuable information that can be used to determine whether the Tx input frame is an echo. FIG. 8 examines the performance of the echo canceller's filter to determine if the Tx input is an echo. The filter outputs an estimate of the echo of the Rx input that FIG. 8 analyzes to find the error in the accuracy of the filter's estimation. If the filter's output converges well to the echo, the error will decrease. If the error grows too large relative to the energy level of the Tx input, the system assumes that the Tx input is not just an echo (e.g., it is an echo plus near-end talker). Another confidence measure, the EC filter error confidence counter, that is used in adjusting the filter coefficient update gain may also be computed by the process. The EC error confidence counter indicates the confidence that the Tx input is an echo based on the scaled moving average of the energy level of the Tx input compared to the energy of the peak error of the filter. The EC error confidence counter is incremented whenever the energy level of the Tx input is substantially larger than the error in the filter's output. Typically, the error is low when the Tx input is an echoed version of the Rx input and the error is high when the Tx input is not just an echo, but contains a speech signal from a near-end talker.

Step 800 determines if the largest Rx frame energy is greater than Threshold 1. If the largest Rx frame energy is not greater than Threshold 1, the system deems the Rx input frame to not qualify as a valid Rx input and thus, the frame cannot be an echo. In this case, the system clears the error confidence counter in step 802 and skips to step 900. On the other hand, if the largest Rx frame energy is greater than Threshold 1 (i.e., the Rx input frame is valid), the moving average of the energy level of the Tx input is calculated. This moving average may be equal to 0.9*(Average Tx input energy)+0.1*(Tx frame energy from two frames ago), as shown in step 804. Step 806 determines if (energy of the EC filter output error)*Constant is less than the energy level of the peak error of the filter. If (energy of the EC filter output error)*Constant is greater than or equal to the energy level of the peak error of the filter, step 808 sets the peak error energy equal to the energy of the filter's output error and the process skips to step 812. If (energy of the EC filter output error)*Constant is less than the energy level of the peak error of the filter, step 810 sets the peak error energy to 0.9*(peak error energy)+0.1*(energy of the filter's output error). In other words, if the current error of the filter is greater than the peak error of the filter, the peak error is updated immediately; otherwise the peak error is allowed to decay slowly.

After setting the peak error energy, step 812 determines if the double talk delay counter is zero. If the double talk counter is not zero, there is double talk and the filter's error will be large so the system skips steps 814, 816 and 818. Step 802 clears the filter error confidence counter to indicate that there is double talk and the process skips to step 900. If the double talk counter is zero, step 814 sets W=Constant 1*(moving average Tx input energy)+Constant 2 and then sets W to be the maximum of this W and Constant 3. Essentially, W is set to some scaled version of the moving average Tx input energy, and the Constant 2 and Constant 3 allow the system to adjust W to account for inaccuracies in the moving average. Of course, other equations and methods to set W are possible.

Step 816 determines if W is substantially greater than the peak error energy. If not, step 802 clears the error confidence counter and the process skips to step 900. If W is substantially greater than the peak error energy, this means there is an echo because the peak error energy is very small where there is an echo. If there is an echo, step 818 increments the error confidence counter.

The process examines the pitch lag confidence counter and the EC error confidence counter to determine if the filter's coefficients should be updated and what gain to use. The adaptation flag indicates whether the filter should be updated where "0" designates "don't update" and "1" means "update." The adaptation gain is the gain used to update the echo canceller's transversal filter coefficients. When double talk is present (e.g., when the double talk delay counter is greater than 0 in step 900), the system disables the updating of the filter coefficients by setting the adaptation flag to 0 in step 902, and the process skips to step 1000.

When double talk is not present in step 900, the pitch lag confidence counter and the EC error confidence counter are checked. Steps 904, 912 and 924 determine the confidence level of the EC error confidence counter. In this particular example, there are three possible confidence levels: high, medium and low. However, it is certainly contemplated that more or less confidence levels may be used. Step 904 determines whether the EC error confidence counter exceeds a high threshold, threshold A. If the EC error confidence counter exceeds a high threshold, step 906 enables the updating of the filter coefficient by setting the adaptation flag to 1 and sets the adaptation gain to a high gain because the system wants the filter to converge fastest when the level of confidence that the Tx input is an echo is highest.

If the EC error confidence counter does not exceed a high threshold, the system checks to see if the other confidence measure, the pitch lag confidence counter, exceeds a high threshold. Note that the high threshold for the pitch lag confidence counter, threshold B, may be equal or different than the high threshold for the EC error confidence counter, threshold A. Step 908 determines whether the pitch lag confidence counter is greater than threshold B. If yes, step 910 sets the adaptation flag to 1 and the adaptation gain to high. If the pitch lag confidence counter is not greater than threshold B, the system examines whether either of the EC error confidence counter or the pitch lag confidence counter exceeds thresholds that indicate a medium level of confidence.

Step 912 determines whether the EC error confidence counter is greater than threshold C, which is less than threshold A and greater than threshold E. If the EC error confidence counter is greater than threshold C, there is a medium level of confidence that the Tx input is an echo. Step 914 sets the adaptation flag to 1 and the adaptation gain to a medium gain. If the EC error confidence counter is not greater than threshold C, step 916 determines whether the pitch flag confidence counter is greater than threshold D, where threshold D is less than threshold B and greater than threshold F. If the pitch flag confidence counter is greater than threshold D, step 918 sets the adaptation flag to 1 and the adaptation gain to medium. If the pitch flag confidence counter is not greater than threshold D, step 920 determines whether the EC error confidence counter is greater than threshold E. If the EC error confidence counter is greater than threshold E, step 922 sets the adaptation flag to 1 and the adaptation gain to low. If the EC error confidence counter is not greater than threshold E, step 924 determines whether the pitch flag confidence counter is greater than threshold F. If the pitch flag confidence counter is greater than threshold F, step 926 sets the adaptation flag to 1 and the adaptation gain to low.

Note that steps 902, 906, 910, 914, 918, 922 and 926 all cause the process to skip to step 1000. If the pitch flag confidence counter is not greater than threshold F in step 924, neither the EC error confidence counter nor the pitch flag confidence counter had a sufficiently high enough confidence level to justify updating the filter. In other words, although the system believes that the Tx input could be an echo, the system is not sure enough to update the filter. In this case, step 928 clears the adaptation flag to 0 and sets the adaptation gain to 0.

Figure 10:
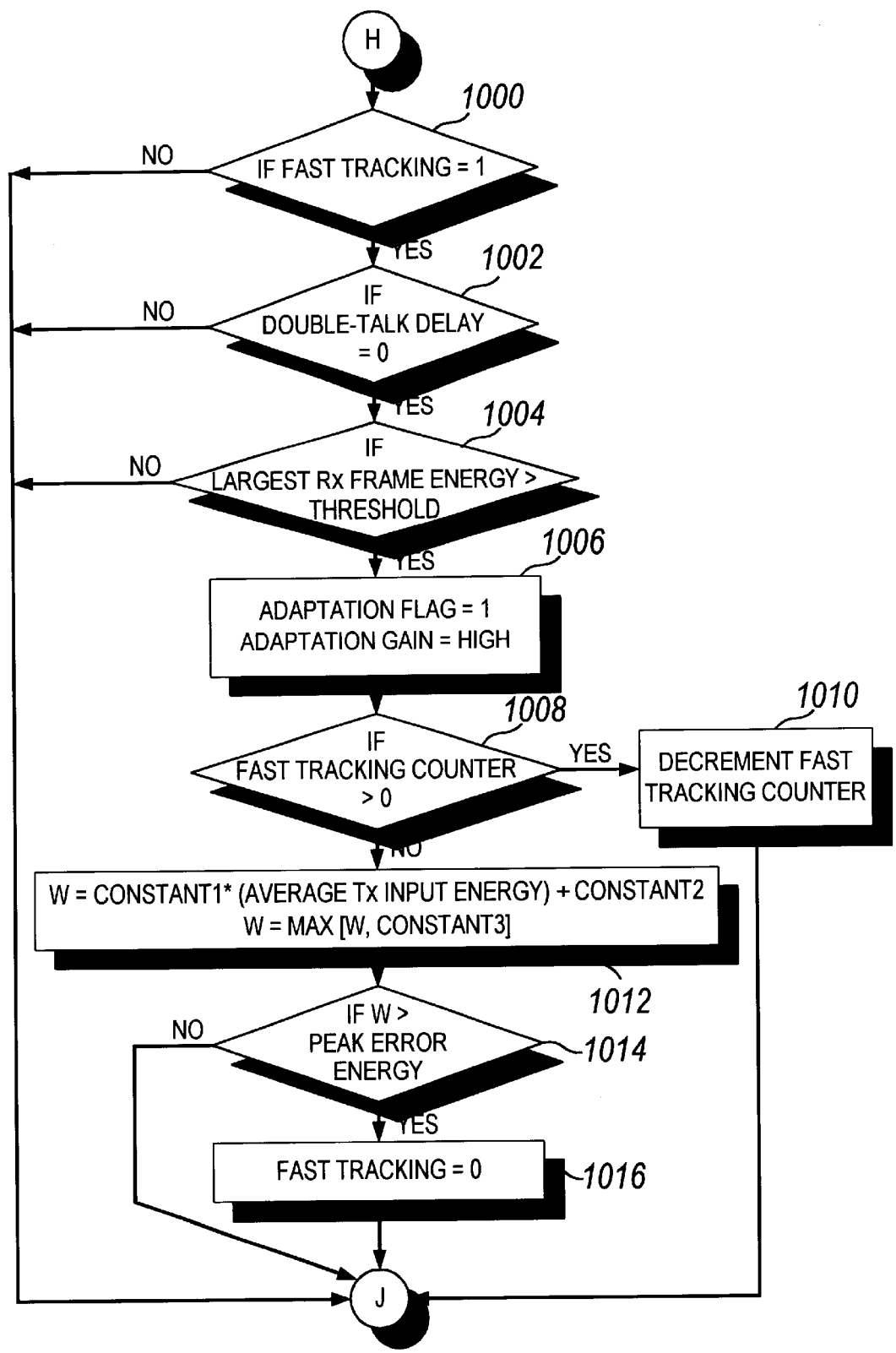
FIG. 10 is a flow chart illustrating implementation of an initial fast tracking mode.

The flowchart in FIG. 10 implements an initial fast tracking mode. The fast tracking mode permits the echo canceller's filter to converge quickly at the beginning of its processing (e.g., the start of a telephone conversation on the communication system). At the early stage of echo cancellation, the filter is far from creating an accurate model of an echo. Thus, the system optionally uses FIG. 10 to speed up the convergence of the filter at the beginning of a conversation. In other words, the system updates the filter whenever possible during this early phase.

The fast tracking flag indicates the status of the mode. That is, if the fast tracking flag is 0, the fast tracking mode is off. If, on the other hand, the fast tracking flag is 1, then the fast tracking mode is on. The fast tracking mode continues for a minimum number of frames that is specified by the fast tracking counter. The fast tracking counter dictates the amount of time during which the system wants to allow the filter to converge quickly. During the fast tracking mode, the adaptation flag is enabled and the gain is set to high whenever double talk is not present. After the minimum number of frames has expired, a scaled average of the Tx input is compared to the peak error of the filter output to determine if the filter has converged sufficiently to turn the fast tracking mode off. When the filter has reached the desired level of convergence, the fast tracking mode is disabled.

In FIG. 10, step 1000 determines whether the fast tracking mode is enabled (i.e., the fast tracking flag=1). If the fast tracking mode is off, the process skips to step 1100 of FIG. 11. If the fast tracking mode is on, step 1002 determines if double talk is present by checking the double talk delay counter. If there is double talk, the process skips to step 1100. Otherwise, step 1004 determines if the largest energy of an Rx input frame is greater than a threshold in order to ascertain whether there is a valid Rx input to consider. If the largest energy of an Rx input frame is not greater than a threshold (i.e., there is no valid Rx input frame to consider), the process skips to step 1100. If there is a valid Rx input frame to consider, step 1006 sets the adaptation flag to 1 and the adaptation gain to high. Step 1008 then determines if the time duration of the fast tracking mode has not expired (i.e., if the fast tracking counter is greater than 0). If the fast tracking mode should continue to run, step 1010 decrements the fast tracking counter and skips to step 1100. If the fast tracking mode should end (i.e., the fast tracking counter is 0), step 1012 sets W to be equal to Constant 1 *(average Tx input energy)+Constant 2 and sets W to be the larger of the previous W and Constant 3. As with any of the formulas, the formula and Constants for W can be changed to virtually any appropriate formula, with fewer or more Constants.

Step 1014 determines whether W is greater than the peak error energy. If W exceeds the peak error energy, that means that the peak error energy is small, which in turn means that the filter is close to convergence. Step 1016 sets the fast tracking flag to 0 which turns off the fast tracking mode and the process continues to step 1100. If W is not greater than the peak error energy, the process exits to step 1100.

After the filter converges to an accurate echo model, situations may change that require that the filter converge to a different echo model. For example, during the middle of a conversation, the echo model typically changes if an additional person picks up an extension phone on the line. If a talker uses a speaker phone and the talker is sitting close the phone, an echo model may be created. However, if the talker moves away from the speaker phone, the echo model may change. In these circumstances, the filter is no longer convergent and the system finds it desirable to force the filter to converge as fast as possible to a new echo model. Thus, the flowchart in FIG. 11 determines whether to reactivate the fast tracking mode when the filter must converge to a new echo model. Whenever the echo path model changes, the fast tracking mode should be re-enabled to make the filter converge faster to its new model.

Figure 11:
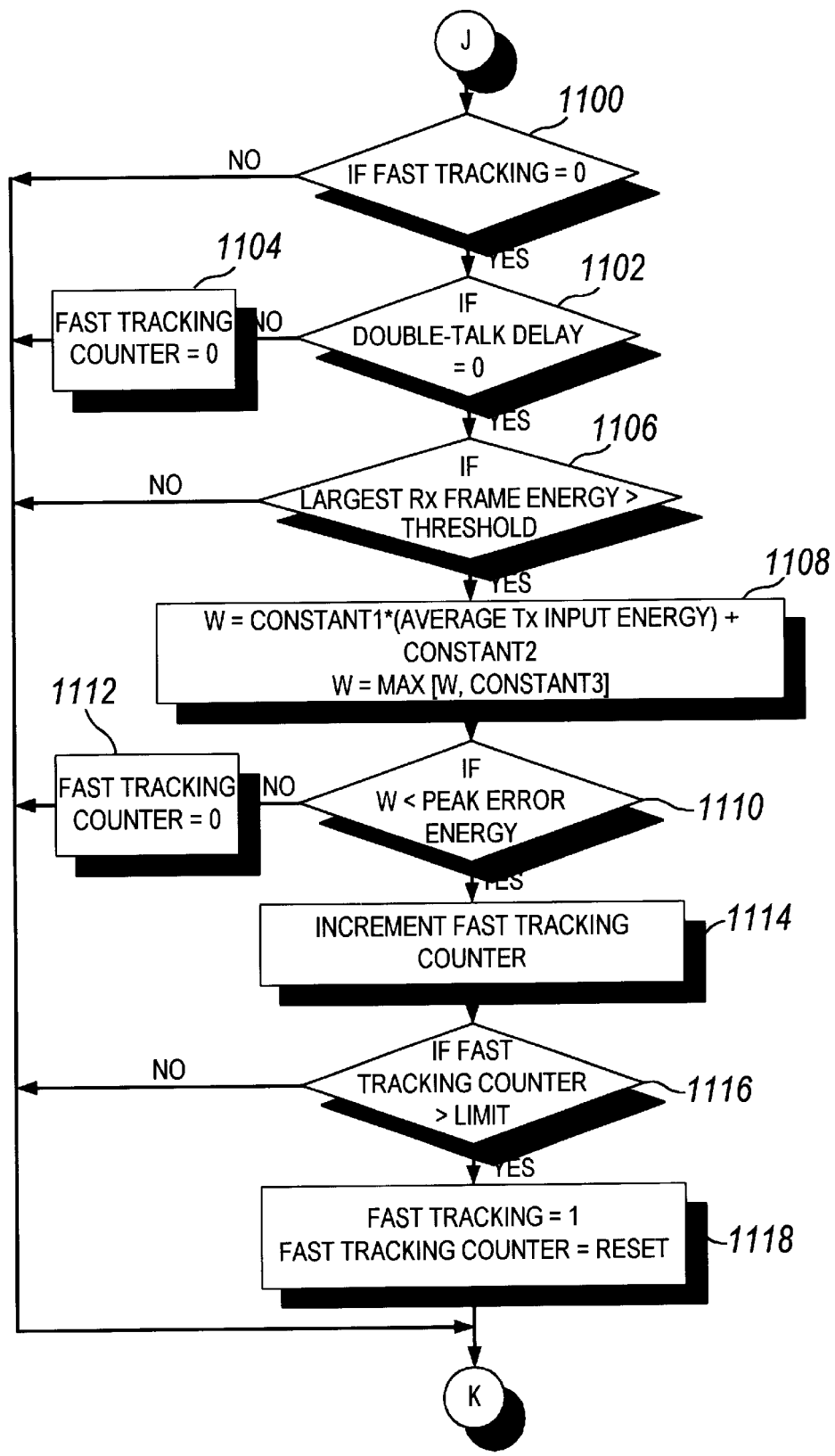
FIG. 11 is a flow chart illustrating comparison of the $T_x$ to the error in the filter output during periods of no double talk to detect changes in the echo path.

In FIG. 11, the Tx input is compared to the error in the filter output during those periods when there is no double talk in order to detect changes in the echo path. Step 1100 determines whether the fast tracking mode is disabled (i.e., fast tracking flag is 0). If the fast tracking flag is 1, the process skips to step 1200 of FIG. 12. If the fast tracking mode is disabled, step 1102 determines whether there is double talk by determining if the double talk delay counter is 0. If there is double talk, one cannot estimate the new echo model so there is no need to reactivate the fast tracking mode. As a result, step 1104 clears the fast tracking counter to 0 and the process skips to step 1200.

If there is no double talk (i.e., the double talk delay counter is 0), step 1106 determines whether the largest energy of an Rx input frame is greater than a threshold. If the largest energy of an Rx input frame is greater than a threshold, there is a valid Rx input frame to consider. If there is no valid Rx input frame to consider, the process skips to step 1200. If there is a valid Rx input frame to consider (i.e., the largest Rx frame energy exceeds the threshold), step 1108 sets W to be equal to Constant 1*(average Tx input energy)+Constant 2. Step 1108 then adjusts W to be the larger of the previously calculated W and Constant 3. As with any of the formulas, the formula and Constants for W can be changed to virtually any appropriate formula, with fewer or more Constants. Step 1110 determines whether W is less than the peak error energy. If W is greater than or equal to the peak error energy, the filter error is still small enough so step 1112 clears the fast tracking counter to 0 and skips to step 1200. If W is less than the peak error energy, the error has become too large and step 1114 increments the fast tracking counter. Step 1116 determines whether the fast tracking counter exceeds a limit. If not, the process skips to step 1200. If the fast tracking counter does exceed the limit, the filter error has been too high for a long enough time (as set by "limit" in step 1116), so the system will reactivate the fast tracking mode to force the filter to reconverge at a faster rate. In this situation, step 1118 sets the fast tracking flag to 1 (i.e., enables the fast tracking mode) and sets the fast tracking counter to "reset" where reset is the minimum amount of time to stay in the fast tracking mode.

Figure 12:
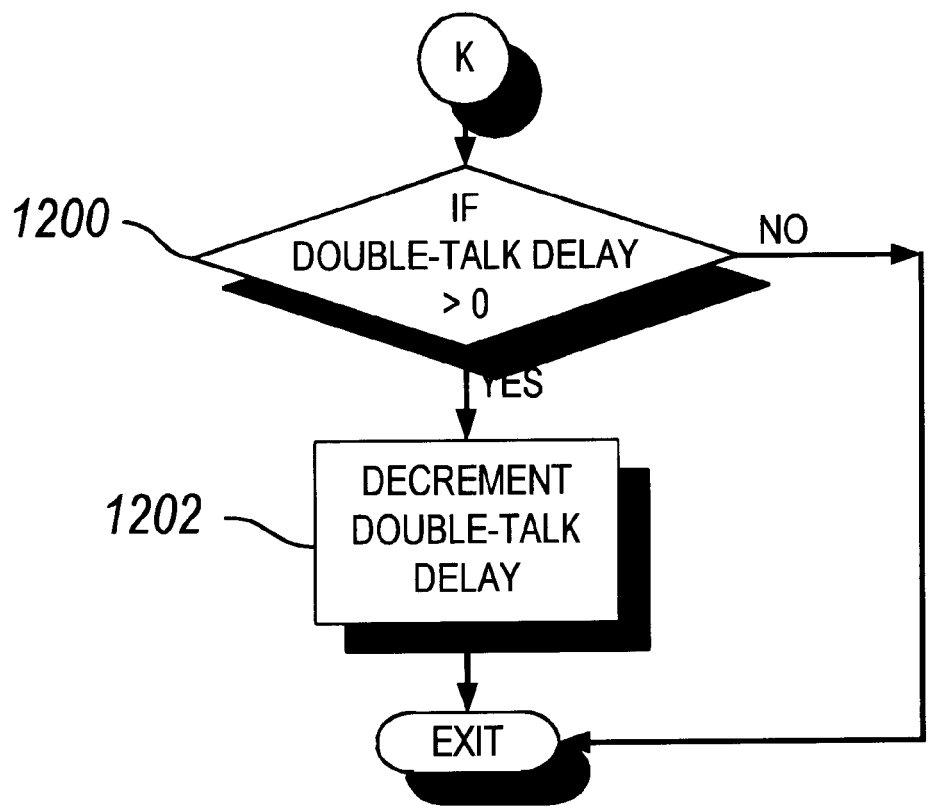
FIG. 12 is a flow chart illustrating determination of a state of the double talk delay counter.

In the flowchart of FIG. 12, step 1200 determines whether the double talk delay counter is greater than 0. If the double talk delay is 0, the process of FIG. 12 exits. If the double talk delay counter is greater than 0, the double talk delay counter is decremented in step 1202 and the process of FIG. 12 then exits.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A method for detecting an echo signal or a double talk signal in a speech communication system, comprising the steps of:

receiving a frame of an outgoing signal from a first user;

receiving a frame of an unknown signal;

obtaining a characteristic of the outgoing signal on a frame-by-frame basis;

obtaining the same characteristic of the unknown signal on a frame-by-frame basis;

comparing the characteristic of the unknown signal with the characteristic of the outgoing signal on a frame-by-frame basis; and determining whether the unknown signal is an echo of the outgoing signal or a double talk signal based on the frame-based comparison of the characteristic.

2. The method for detecting an echo signal or a double talk signal of claim 1 wherein the comparing step compares the characteristic of the unknown signal with the characteristic of the outgoing signal over a plurality of frames.

3. The method for detecting an echo signal or a double talk signal of claim 1 wherein the characteristic is a pitch lag, pitch gain, or both the pitch lag and pitch gain.

4. The method for detecting an echo signal or a double talk signal of claim 1 wherein the characteristic is an energy.

5. The method for detecting an echo signal or a double talk signal of claim 1 wherein the obtaining step obtains a plurality of characteristics of the unknown signal and a plurality of characteristics of the outgoing signal.

6. The method for detecting an echo signal or a double talk signal of claim 5 wherein the plurality of characteristics include some combination of pitch lags, pitch gains and/or energies.

7. The method for detecting an echo signal or a double talk signal of claim 5 wherein the plurality of characteristics include pitch lags of a plurality of frames of the outgoing signal and the unknown signal.

8. The method for detecting an echo signal or a double talk signal of claim 5 wherein the plurality of characteristics include pitch gains of a plurality of frames of the outgoing signal and the unknown signal.

9. The method for detecting an echo signal or a double talk signal of claim 5 further comprising the step of weighing the comparison results wherein the determining step determines whether the unknown signal is an echo of the outgoing signal based on the weighted results.

10. The method for detecting an echo signal or a double talk signal of claim 1 further comprising:

buffering the characteristic of the unknown signal;

buffering the characteristic of the outgoing signal; and wherein the comparing step compares the buffered characteristic of the unknown signal with the buffered characteristic of the outgoing signal.

11. The method for detecting an echo signal or a double talk signal of claim 1 further comprising the step of establishing a first level of confidence that indicates the level of confidence that the unknown signal is a double talk signal from a second user.

12. The method for detecting an echo signal of claim 11 wherein the first level of confidence becomes more confident when an energy level of a frame of the unknown signal exceeds a maximum allowable energy level of an echo signal.

13. The method for detecting an echo signal or a double talk signal of claim 11 wherein the first level of confidence becomes more confident when a pitch gain of a voiced frame of the unknown signal is less than a minimum allowable pitch gain of a voiced frame of an echo signal.

14. The method for detecting an echo signal or a double talk signal of claim 11 wherein the first level of confidence becomes more confident when a pitch lag of a voiced frame of the unknown signal does not correlate with a pitch lag of a voiced frame of the outgoing signal.

15. The method for detecting an echo signal or a double talk signal of claim 14 wherein if the pitch lag of a voiced frame of the unknown signal does not correlate with the pitch lag of a voiced frame of the outgoing speech signal, the first level of confidence is set to indicate a high level of confidence that the unknown signal is a double talk signal from the second user.

16. The method for detecting an echo signal or a double talk signal of claim 11 further comprising the step of setting a second level of confidence to one of a plurality of levels based on the level of the first level of confidence.

17. The method for detecting an echo signal or a double talk signal of claim 11 further comprising the step of establishing a second level of confidence that indicates the level of confidence that the unknown signal contains only an echo of the outgoing signal from the first user.

18. The method for detecting an echo signal or a double talk signal of claim 17 wherein the second level of confidence becomes more confident when an energy level of a frame of the unknown signal is less than a maximum allowable energy level of an echo signal.

19. The method for detecting an echo signal or a double talk signal of claim 17 wherein the second level of confidence becomes more confident when the pitch lag of a voiced frame of the unknown signal correlates with a pitch lag of a voiced frame of the outgoing signal.

20. The method for detecting an echo signal or a double talk signal of claim 19 wherein if the pitch lag of a voiced frame of the unknown signal correlates with the pitch lag of a voiced frame of the outgoing signal, the second level of confidence is set to indicate a high level of confidence that the unknown signal contains only an echo of the outgoing signal of the first user.

21. The method for detecting an echo signal or a double talk signal of claim 17 further comprising the step of setting a third level of confidence to one of a plurality of levels based on the level of the second level of confidence.

22. The method for detecting an echo signal or a double talk signal of claim 11 further comprising:

using a filter to generate an estimated echo signal;

determining a maximum error between an energy of the estimated echo signal with an energy of the outgoing signal; and establishing a second level of confidence that becomes more confident when an energy of a frame of the unknown signal is less than the maximum error.

23. The method for detecting an echo signal or a double talk signal of claim 22 further comprising:

establishing a second level of confidence that indicates the level of confidence that the unknown signal is a double talk signal from a second user, the second level of confidence becoming more confident when a pitch lag of a voiced frame of the unknown signal does not correlate with a pitch lag of a voiced frame of the outgoing signal;

determining whether the second level of confidence exceeds a first threshold; enabling the updating of the filter and setting a gain for the filter to a high gain value if the second level of confidence exceeds the first threshold;

determining whether the second level of confidence exceeds a second threshold;

enabling the updating of the filter and setting the gain for the filter to a low gain value if the second level of confidence exceeds the second threshold; and disabling the updating of the filter if the second level of confidence does not exceed the first threshold.

24. The method for detecting an echo signal or a double talk signal of claim 11 further comprising:

using a filter to generate an estimated echo signal;

determining whether the first level of confidence exceeds a first threshold;

enabling the updating of the filter and setting the gain for the filter to a high gain value if the first level of confidence exceeds the first threshold;

determining whether the first level of confidence exceeds a second threshold;

enabling the updating of the filter and setting the gain for the filter to a low gain value if the first level of confidence exceeds the second threshold; and disabling the updating of the filter if the first level of confidence does not exceed the first threshold.

25. The method for detecting an echo signal or a double talk signal of claim 1 further comprising:

providing a filter that generates an estimated echo signal;

determining whether the filter has been operating for more than a threshold duration;

determining whether the filter's estimated echo signal is substantially non-convergent with the echo signal; and updating the filter if the filter has been operating for less than a threshold duration even if the filter's estimated echo signal is substantially non-convergent with the echo signal.

26. The method for detecting an echo signal or a double talk signal of claim 25 wherein the step of determining whether the filter's estimated echo signal is substantially nonconvergent with the echo signal includes the steps of determining the maximum error between the energy of the estimated echo signal and the energy of the outgoing signal and determining whether the filter's estimated echo signal is substantially non-convergent with the echo signal based on whether the maximum error is a small value.

27. The method for detecting an echo signal or a double talk signal of claim 25 further comprising:

determining the maximum error between the energy of the estimated echo signal with the energy of the outgoing signal;

determining the duration during which the maximum error is a high value; and if the maximum error occurs for more than a threshold duration, updating the filter even if the filter's estimated echo signal is substantially non-convergent with the echo signal.

28. The method for detecting an echo signal or a double talk signal of claim 1 further comprising:

providing a filter that generates an estimated echo signal;

determining whether the filter has been operating for more than a threshold duration;

determining whether the filter's estimated echo signal is substantially non-convergent with the echo signal; and updating the filter if the filter's estimated echo signal is substantially convergent with the echo signal and the filter has been operating for more than a threshold duration.

29. The method of claim 1 further comprising the step of establishing two confidence measures that together indicate a level of confidence that the unknown signal is an echo of the outgoing signal.

30. The method of claim 29 further comprising:

providing a filter that generates an estimated echo signal;

determining an error between the unknown signal and the estimated echo signal; and adjusting a first confidence measure so that it becomes less confident when an energy level of the error exceeds a threshold energy level.

31. The method of claim 29, wherein the second confidence measure becomes more confident when a pitch lag of a voiced frame of the unknown signal correlates with a pitch lag of a voiced frame of the outgoing signal.

32. The method of claim 1 further comprising:

providing an adjustable filter that generates an estimated echo signal; and inhibiting the adjustment of the filter if the unknown signal includes a double talk signal.

33. The method of claim 32 further comprising the steps, if the unknown signal does not include the double talk signal, of comparing the two confidence measures against a plurality of thresholds and enabling the adjustment of the filter when at least one of the two confidence measures exceeds at least one of the thresholds.

34. The method of claim 33 further comprising the step of adjusting the filter to a rate of adjustment that depends on which of the thresholds is exceed by which of the confidence measures.

35. The method of claim 33 further comprising the step of providing an initial fast tracking mode where when the unknown signal does not include the double talk signal, the filter is adjusted at a fast rate regardless of the step of enabling the filter adjustment.

36. The method of claim 35 wherein the initial fast tracking mode continues for a period of time.

37. The method of claim 35 further comprising the steps, when not in the initial fast tracking mode and when the unknown signal does not include the double talk signal, of:

determining an error between the unknown signal and the estimated echo signal; and re-enabling the initial fast tracking mode if the error is larger than a threshold error over a predefined period of time.

38. A system for detecting an echo signal or a double talk signal in a speech communication network, the system comprising:

a frame processor coupled to the speech communication network that receives an outgoing speech signal and an unknown signal from the speech communication network in a frame by frame manner;

a signal processor that obtains a characteristic of the outgoing speech signal on a frame basis, obtains the characteristic of a frame of the unknown signal on a frame basis, and compares the characteristic of the unknown signal on a frame basis with the characteristic of the outgoing speech signal on a frame basis; and a double talk detector that receives the frame-based comparison of the characteristic and determines whether the unknown signal is an echo of the outgoing speech signal or a double talk signal.

39. The system for detecting an echo signal of claim 38 wherein the double talk detector compares the characteristic of a frame of the outgoing speech signal with the characteristic of the unknown signal over a plurality of frames.

40. The system for detecting an echo signal of claim 38 wherein the characteristic is a pitch lag, pitch gain, or both the pitch lag and pitch gain.

41. The system for detecting an echo signal of claim 38 wherein the characteristic is an energy.

42. The system for detecting an echo signal of claim 38 wherein the signal processor obtains a plurality of characteristics of the unknown signal and a plurality of characteristics of the outgoing speech signal.

43. The system for detecting an echo signal of claim 42 wherein the plurality of characteristics include some combination of pitch lags, pitch gains and/or energies.

44. The system for detecting an echo signal of claim 42 wherein the plurality of characteristics include pitch lags of a plurality of frames of the outgoing speech signal and the unknown signal.

45. The system for detecting an echo signal of claim 42 wherein the plurality of characteristics include pitch gains of a plurality of frames of the outgoing speech signal and the unknown signal.

46. The system for detecting an echo signal of claim 42 wherein the double talk detector weighs the comparison results from the signal processor and uses the weighted comparison results to determine whether the unknown signal is an echo of the outgoing speech signal.

47. The system for detecting an echo signal of claim 38 further comprising:
  a first buffer to store the characteristic of a plurality of frames of the unknown signal; and
  a second buffer to store the characteristic of a plurality of frames of the outgoing speech signal; wherein the signal processor compares the buffered characteristic of the unknown signal with the buffered characteristic of the outgoing speech signal.

48. The system for detecting an echo signal of claim 38 further comprising a confidence level establisher that establishes a first level of confidence which indicates the level of confidence that the unknown signal is a double talk signal from a second user.

49. The system for detecting an echo signal of claim 48 wherein the first level of confidence becomes more confident when an energy level of a frame of the unknown signal exceeds a maximum allowable energy level of an echo signal.

50. The system for detecting an echo signal of claim 48 wherein the first level of confidence becomes more confident when a pitch gain of a voiced frame of the unknown signal is less than a minimum allowable pitch gain of a voiced frame of an echo signal.

51. The system for detecting an echo signal of claim 48 wherein the first level of confidence becomes more confident when a pitch lag of a voiced frame of the unknown signal does not correlate with a pitch lag of a voiced frame of the outgoing speech signal.

52. The system for detecting an echo signal of claim 51 wherein if the pitch lag of a voiced frame of the unknown signal does not correlate with a pitch lag of a voiced frame of the outgoing speech signal, the first level of confidence is set to indicate a high level of confidence that the unknown signal is a double talk signal from a second user.

53. The system for detecting an echo signal of claim 48 further comprising a confidence level establisher that sets a second level of confidence to one of a plurality of levels based on the level of the first level of confidence.

54. The system for detecting an echo signal of claim 48 further comprising a confidence level establisher that determines a second level of confidence which indicates the level of confidence that the unknown signal contains only an echo of the outgoing speech signal from the first user.

55. The system for detecting an echo signal of claim 54 wherein the second level of confidence becomes more confident when the energy level of a frame of the unknown signal is less than a maximum allowable energy level of an echo signal.

56. The system for detecting an echo signal of claim 54 wherein the second level of confidence becomes more confident when a pitch lag of a voiced frame of the unknown signal correlates with a pitch lag of a voiced frame of the outgoing speech signal.

57. The system for detecting an echo signal of claim 56 wherein if the pitch lag of a voiced frame of the unknown signal correlates with the pitch lag of a voiced frame of the outgoing speech signal, the confidence level establisher sets the second level of confidence to indicate a high level of confidence that the unknown signal contains only an echo of the outgoing speech signal of the first user.

58. The system for detecting an echo signal of claim 54 wherein the confidence level establisher sets a third level of confidence to one of a plurality of levels based on level of the second level of confidence.

59. The system for detecting an echo signal of claim 48 further comprising:
  a filter that generates an estimated echo signal;
  the signal processor obtaining an energy of the outgoing speech signal, obtaining an energy of the estimated echo signal and determining an error between the energy of the outgoing speech signal and the energy of the estimated echo signal;
  the double talk detector determining a maximum error between the energy of the estimated echo signal and the energy of the outgoing speech signal; and
  the confidence level establisher setting the first level of confidence to be more confident when the energy of the unknown signal is less than the maximum error.

60. The system for detecting an echo signal of claim 59 wherein the confidence level establisher determines a second level of confidence that indicates the level of confidence that the unknown signal is a double talk signal from a second user, the confidence level establisher setting the second level of confidence to represent increased confidence when a pitch lag of a voiced frame of the unknown signal does not correlate with a pitch lag of a voiced frame of the outgoing speech signal, the confidence level establisher determining whether the second level of confidence exceeds a first threshold and whether the second level of confidence exceeds a second threshold;
  an echo canceller which, if the second level of confidence exceeds the first threshold, enables updating of the filter and sets a gain for the filter to a high gain value, the echo canceller which, if the second level of confidence exceeds the second threshold, enables the updating of the filter and sets the gain for the filter to a low gain value, the echo canceller disables the updating of the filter if the second level of confidence does not exceed the first threshold.

61. The system for detecting an echo signal of claim 48 further comprising:
  a filter that generates an estimated echo signal;
  the double talk detector determining whether the first level of confidence exceeds a first threshold and whether the first level of confidence exceeds a second threshold; and an echo canceller which, if the first level of confidence exceeds the first threshold, enables updating of the filter and sets the gain for the filter to a high gain value, the echo canceller which, if the first level of confidence exceeds the second threshold, enables updating of the filter and sets a gain for the filter to a low gain value, and the echo canceller which, if the first level of confidence does not exceed the first threshold, disables the updating of the filter.

62. The system for detecting an echo signal of claim 61 wherein any of the echo canceller, the frame processor, the signal processor, the double talk detector and the confidence level establisher may be integrated into any of the others.

63. The system for detecting an echo signal of claim 48 wherein the confidence level establisher may be integrated into any of the frame processor, the signal processor and the double talk detector.

64. The system for detecting an echo signal of claim 38 further comprising:

a filter that generates an estimated echo signal; and a fast tracking mode processor which determines whether the filter has been operating for more than a threshold duration and determines whether the filter's estimated echo signal is substantially non-convergent with the echo signal, the fast tracking processor permitting the filter to be updated if the filter has been operating for less than the threshold duration even if the filter's estimated echo signal is substantially non-convergent with the echo signal.

65. The system for detecting an echo signal of claim 64 wherein any of the fast tracking mode processor, the frame processor, the signal processor and the double talk detector may be integrated into any of the others.

66. The system for detecting an echo signal of claim 38 further comprising:

a filter that generates an estimated echo signal; and a fast tracking mode processor which determines whether the filter has been operating for more than a threshold duration and determines whether the filter's estimated echo signal is substantially non-convergent with the echo signal, the fast tracking processor permitting the filter to be updated if the filter has been operating for more than a threshold duration and the filter's estimated echo signal is substantially convergent with the echo signal.

67. The system for detecting an echo signal of claim 66 wherein the fast tracking mode processor determines a maximum error between an energy of the estimated echo signal and an energy of outgoing speech signal and determines whether the filter's estimated echo signal is substantially non-convergent with the echo signal based on whether the maximum error is a small value.

68. The system for detecting an echo signal of claim 66 wherein the fast tracking mode processor determines a maximum error between an energy of the estimated echo signal and an energy of the outgoing speech signal and determines the duration during which the maximum error is a high value, wherein the fast tracking mode processor allows the filter to be updated if the duration during which the maximum error is a high value exceeds a threshold even if the filter's estimated echo signal is substantially non-convergent with the echo signal.

69. The system for detecting an echo signal of claim 38 wherein any of the frame processor, the signal processor and the double talk detector are integrated into any of the others.

70. A method for establishing that an unknown signal includes a double talk signal in a speech communication system, the method comprising:

receiving an unknown signal; and establishing a first level of confidence that indicates the level of confidence that the unknown signal is a double talk signal;

wherein the first level of confidence becomes more confident when a pitch lag of a voiced frame of the unknown signal does not correlate with a pitch lag of a voiced frame of an outgoing speech signal and wherein if the pitch lag of a voiced frame of the unknown signal does not correlate with the pitch lag of a voiced frame of the outgoing speech signal, the first level of confidence is set to indicate a high level of confidence that the unknown signal is a double talk signal from a second user.

71. The method for establishing that an unknown signal includes a double talk signal of claim 70 wherein the first level of confidence becomes more confident when an energy level of a frame of the unknown signal exceeds a maximum allowable energy level of an echo signal.

72. The method for establishing that an unknown signal includes a double talk signal of claim 70 wherein the first level of confidence becomes more confident when a pitch gain of a voiced frame of the unknown signal is less than a minimum allowable pitch gain of a voiced frame of an echo signal.

73. The method for establishing that an unknown signal includes a double talk signal of claim 70 further comprising the step of setting a second level of confidence to one of a plurality of levels based on a level of the first level of confidence.

74. A method for establishing that an unknown signal includes a double talk signal in a speech communication system, the method comprising:

receiving an unknown signal; and establishing a first level of confidence that indicates the level of confidence that the unknown signal is a double talk signal;

establishing a second level of confidence that indicates a level of confidence that the unknown signal contains only an echo of a outgoing signal from a first user;

wherein the second level of confidence becomes more confident when a pitch lag of a voiced frame of the unknown signal correlates with a pitch lag of a voiced frame of the outgoing speech signal.

75. The method for establishing that an unknown signal includes a double talk signal of claim 74 wherein the second level of confidence becomes more confident when an energy level of a frame of the unknown signal is less than a maximum allowable energy level of an echo signal.

76. The method for establishing that an unknown signal includes a double talk signal of claim 74 wherein if the pitch lag of a voiced frame of the unknown signal correlates with the pitch lag of a voiced frame of the outgoing speech signal, the second level of confidence is set to indicate a high level of confidence that the unknown signal contains only an echo of the outgoing signal of the first user.

77. The method for establishing that an unknown signal includes a double talk signal of claim 74 further comprising the step of setting a third level of confidence to one of a plurality of levels based on the level of the second level of confidence.

78. A method for establishing that an unknown signal includes a double talk signal in a speech communication system, the method comprising:

receiving an unknown signal; and establishing a first level of confidence that indicates the level of confidence that the unknown signal is a double talk signal;

using a filter to generate an estimated echo signal;

determining a maximum error between an energy of an estimated echo signal with an energy of an outgoing signal; and establishing a second level of confidence that becomes more confident when an energy of a frame of the unknown signal is less than a maximum error.

79. The method for establishing that an unknown signal includes a double talk signal of claim 78 further comprising:

establishing a second level of confidence that indicates the level of confidence that the unknown signal is a double talk signal from a second user, the second level of confidence becoming more confident when a pitch lag of a voiced frame of the unknown signal does not correlate with a pitch lag of a voiced frame of the outgoing speech signal;

determining whether the second level of confidence exceeds a first threshold; enabling the updating of the filter and setting the gain for the filter to a high gain value if the second level of confidence exceeds the first threshold; determining whether the second level of confidence exceeds a second threshold;

enabling an updating of the filter and setting a gain for the filter to a low gain value if the second level of confidence exceeds the second threshold; and disabling the updating of the filter if the second level of confidence does not exceed the first threshold.

80. A method for establishing that an unknown signal includes a double talk signal in a speech communication system, the method comprising:

receiving an unknown signal; and establishing a first level of confidence that indicates the level of confidence that the unknown signal is a double talk signal;

using a filter to generate an estimated echo signal;

determining whether the first level of confidence exceeds a first threshold;

enabling an updating of the filter and setting a gain for the filter to a high gain value if the first level of confidence exceeds the first threshold;

determining whether the first level of confidence exceeds a second threshold; enabling an updating of the filter and setting a gain for the filter to a low gain value if the first level of confidence exceeds the second threshold; and disabling the updating of the filter if the first level of confidence does not exceed the first threshold.

81. A method for using a confidence level to control an updating of a filter coefficient in a speech communication system, the method comprising:

using a filter to generate an estimated echo signal; and determining whether a first level of confidence exceeds a first threshold to control the updating of the filter coefficient;

enabling the updating of the filter and setting a gain for the filter to a high gain value if the first level of confidence exceeds the first threshold;

determining whether the first level of confidence exceeds a second threshold;

enabling the updating of the filter and setting the gain for the filter to a low gain value if the first level of confidence exceeds a second threshold; and disabling the updating of the filter if the first level of confidence does not exceed the first threshold.

82. A method for using a confidence level to control an updating of a filter coefficient in a speech communication system, the method comprising:

using a filter to generate an estimated echo signal;

determining whether a first level of confidence exceeds a first threshold to control the updating of the filter coefficient;

establishing a second level of confidence that indicates the level of confidence that an unknown signal is a double talk signal from a second user, the second level of confidence becoming more confident when a pitch lag of a voiced frame of the unknown signal does not correlate with a pitch lag of a voiced frame of an outgoing speech signal;

determining whether the second level of confidence exceeds a first threshold; enabling the updating of the filter and setting the gain for the filter to a high gain value if the second level of confidence exceeds the first threshold;

determining whether the second level of confidence exceeds a second threshold;

enabling the updating of the filter and setting a gain for the filter to a low gain value if the second level of confidence exceeds the second threshold; and disabling the updating of the filter if the second level of confidence does not exceed the first threshold.

* * * * *